United States Patent
Stiff et al.

(10) Patent No.: US 10,055,795 B2
(45) Date of Patent: *Aug. 21, 2018

(54) SYSTEMS AND METHODS FOR PROVIDING A BENEFIT PRODUCT WITH PERIODIC GUARANTEED MINIMUM INCOME

(71) Applicant: Genworth Holdings, Inc., Richmond, VA (US)

(72) Inventors: Geoffrey S. Stiff, Richmond, VA (US); David E. Thomas, Crozier, VA (US); John C. Eza, Nellysford, VA (US); Vickey L. Root, Richmond, VA (US)

(73) Assignee: Genworth Holdings, Inc., Richmond, VA (US)

( * ) Notice: Subject to any disclaimer, the term of this patent is extended or adjusted under 35 U.S.C. 154(b) by 474 days.

This patent is subject to a terminal disclaimer.

(21) Appl. No.: 14/821,901

(22) Filed: Aug. 10, 2015

(65) Prior Publication Data

US 2015/0348205 A1 Dec. 3, 2015

Related U.S. Application Data

(63) Continuation of application No. 13/758,576, filed on Feb. 4, 2013, now Pat. No. 9,105,063, which is a
(Continued)

(51) Int. Cl.
*G06Q 40/08* (2012.01)
*G06Q 10/10* (2012.01)
(Continued)

(52) U.S. Cl.
CPC ......... *G06Q 40/08* (2013.01); *G06Q 10/1057* (2013.01); *G06Q 20/10* (2013.01); *G06Q 40/02* (2013.01); *G06Q 40/06* (2013.01)

(58) Field of Classification Search
CPC .... G06Q 40/08; G06Q 10/1057; G06Q 40/06; G06Q 40/02; G06Q 20/10
See application file for complete search history.

(56) References Cited

U.S. PATENT DOCUMENTS 4,055,757 A  10/1977  Tillman et al.
4,742,457 A  5/1988  Leon et al.
(Continued)

FOREIGN PATENT DOCUMENTS

EP  0621556  10/1994
WO  WO 98/22936  5/1998
(Continued)

OTHER PUBLICATIONS

"TIAA-CREF Life Introduces Innovative Low-Cost Single Premium Immediate Annuity," Aug. 16, 2001.
(Continued)

*Primary Examiner* — Mary D Cheung
(74) *Attorney, Agent, or Firm* — Hunton Andrews Kurth LLP

(57) ABSTRACT

The invention provides systems, and methods of using the systems, implementing a benefit product with a guaranteed minimum income, wherein payment into the benefit product securing the guaranteed minimum income. The system comprises an income recordkeeper interfacing with a plurality of savings recordkeepers, the income recordkeeper including (1) an income recordkeeper interface portion that inputs attributes to the benefit product funded by payments from a plan associated with the benefit product; and (2) an income recordkeeper record keeping system that implements the benefit product, the income recordkeeper record keeping system being in communication with the income recordkeeper interface portion, the income recordkeeper record keeping system: (a) monitoring transactions to the benefit product; and (b) determining, based on the transactions, a
(Continued)

guaranteed minimum income associated with participation in the benefit product.

20 Claims, 6 Drawing Sheets

Related U.S. Application Data continuation of application No. 11/065,441, filed on Feb. 25, 2005, now Pat. No. 8,370,242, which is a continuation-in-part of application No. 10/083,250, filed on Feb. 27, 2002, now Pat. No. 8,781,929, which is a continuation-in-part of application No. 09/876,053, filed on Jun. 8, 2001, now Pat. No. 7,398,241.

(51) Int. Cl.
*G06Q 20/10* (2012.01)
*G06Q 40/02* (2012.01)
*G06Q 40/06* (2012.01)

(56) References Cited

U.S. PATENT DOCUMENTS

| | | |
|---|---|---|
| 4,750,121 A | 6/1988 | Halley |
| 4,876,648 A | 10/1989 | Lloyd |
| 4,969,094 A | 11/1990 | Halley et al. |
| 4,975,840 A | 12/1990 | DeTore et al. |
| 5,291,398 A | 3/1994 | Hagan |
| 5,523,942 A | 6/1996 | Tyler et al. |
| 5,631,828 A | 5/1997 | Hagan |
| 5,655,085 A | 8/1997 | Ryan et al. |
| 5,673,402 A | 9/1997 | Ryan et al. |
| 5,689,649 A | 11/1997 | Altman |
| 5,689,650 A | 11/1997 | McClelland et al. |
| 5,696,907 A | 12/1997 | Tom |
| 5,732,397 A | 3/1998 | DeTore et al. |
| 5,745,706 A | 4/1998 | Wolfberg et al. |
| 5,752,236 A | 5/1998 | Sexton |
| 5,754,980 A | 5/1998 | Anderson et al. |
| 5,806,047 A | 9/1998 | Hackel et al. |
| 5,819,230 A | 10/1998 | Christie et al. |
| 5,864,685 A | 1/1999 | Hagan |
| 5,878,405 A | 3/1999 | Grant et al. |
| 5,893,071 A | 4/1999 | Cooperstein |
| 5,907,828 A | 5/1999 | Meyer et al. |
| 5,911,135 A | 6/1999 | Atkins |
| 5,913,198 A | 6/1999 | Banks |
| 5,926,792 A | 7/1999 | Koppes et al. |
| 5,930,760 A | 7/1999 | Anderton et al. |
| 5,933,815 A | 8/1999 | Golden |
| 5,946,668 A | 8/1999 | George |
| 5,966,700 A | 10/1999 | Gould et al. |
| 5,987,434 A | 11/1999 | Libman |
| 5,995,947 A | 11/1999 | Fraser et al. |
| 5,999,917 A | 12/1999 | Facciani et al. |
| 6,012,043 A | 1/2000 | Albright et al. |
| 6,014,632 A | 1/2000 | Gamble et al. |
| 6,021,397 A | 2/2000 | Jones et al. |
| 6,049,772 A | 4/2000 | Payne et al. |
| 6,052,673 A | 4/2000 | Leon et al. |
| 6,058,376 A | 5/2000 | Crockett |
| 6,064,969 A | 5/2000 | Haskins |
| 6,064,983 A | 5/2000 | Koehler |
| 6,064,986 A | 5/2000 | Edelman |
| 6,071,672 A | 6/2000 | Namba et al. |
| 6,071,673 A | 6/2000 | Iguchi et al. |
| 6,085,174 A | 7/2000 | Edelman |
| 6,235,176 B1 | 5/2001 | Schoen et al. |
| 6,275,807 B1 | 8/2001 | Schirripa |
| 6,282,520 B1 | 8/2001 | Schirripa |
| 6,304,859 B1 | 10/2001 | Ryan et al. |
| 6,343,272 B1 | 1/2002 | Payne et al. |
| 6,473,737 B2 | 10/2002 | Burke |
| 6,584,446 B1 | 6/2003 | Buchanan et al. |
| 6,592,030 B1 | 7/2003 | Hardesty |
| 6,609,111 B1 | 8/2003 | Bell |
| 6,611,807 B1 | 8/2003 | Bernheim et al. |
| 6,611,808 B1 | 8/2003 | Preti et al. |
| 6,611,815 B1 | 8/2003 | Lewis et al. |
| 6,615,180 B1 | 9/2003 | Anderton et al. |
| 6,625,582 B2 | 9/2003 | Richman et al. |
| 6,636,834 B1 | 10/2003 | Schirripa |
| 6,666,768 B1 | 12/2003 | Akers |
| 6,671,677 B2 | 12/2003 | May |
| 6,684,190 B1 | 1/2004 | Powers et al. |
| 6,947,904 B1 | 9/2005 | Macey |
| 6,950,805 B2 | 9/2005 | Kavanaugh |
| 6,963,852 B2 | 11/2005 | Koresko, V |
| 6,999,935 B2 | 2/2006 | Parankirinathan |
| 7,016,871 B1 | 3/2006 | Fisher et al. |
| 7,039,593 B2 | 5/2006 | Sager |
| 7,080,032 B2 | 7/2006 | Abbs et al. |
| 7,089,201 B1 | 8/2006 | Dellinger et al. |
| 7,113,913 B1 | 9/2006 | Davis et al. |
| 7,120,601 B2 | 10/2006 | Chen et al. |
| 7,143,051 B1 | 11/2006 | Hanby et al. |
| 7,149,712 B2 | 12/2006 | Lang |
| 7,249,030 B2 | 7/2007 | Sopko, III et al. |
| 7,249,037 B2 | 7/2007 | Koppes et al. |
| 7,249,077 B2 | 7/2007 | Williams et al. |
| 7,251,623 B1 | 7/2007 | Ryan et al. |
| 7,328,183 B1 | 2/2008 | Leisle |
| 7,376,608 B1 | 5/2008 | Dellinger |
| 7,392,202 B1 | 6/2008 | O'Brien |
| 7,398,241 B2 | 7/2008 | Fay et al. |
| 7,454,379 B1 | 11/2008 | Wolzenski et al. |
| 7,590,583 B1 | 9/2009 | Ferguson et al. |
| 7,613,644 B1 | 11/2009 | Abbs et al. |
| 7,640,202 B2 | 12/2009 | Foti et al. |
| 7,653,560 B2 | 1/2010 | Hueler |
| 7,676,414 B1 | 3/2010 | Abbs et al. |
| 7,685,007 B1 | 3/2010 | Jacobson |
| 7,685,056 B2 | 3/2010 | Menon |
| 7,685,065 B2 | 3/2010 | Weiss et al. |
| 7,689,644 B2 | 3/2010 | Teruyuki et al. |
| 7,698,158 B1 | 4/2010 | Flagg |
| 7,716,075 B1 | 5/2010 | Payne |
| 7,769,664 B2 | 8/2010 | Egan |
| 7,778,907 B1 | 8/2010 | Haskins et al. |
| 7,778,908 B1 | 8/2010 | Grumet |
| 7,797,174 B2 | 9/2010 | Samuels |
| 7,801,792 B2 | 9/2010 | Tatro et al. |
| 7,813,985 B2 | 10/2010 | O'Flinn et al. |
| 7,840,470 B2 | 11/2010 | Robinson |
| 7,840,471 B2 | 11/2010 | Foti et al. |
| 7,853,460 B2 | 12/2010 | Ruark |
| 7,877,306 B2 | 1/2011 | Michalowski et al. |
| 7,877,307 B2 | 1/2011 | Tatro et al. |
| 7,885,832 B2 | 2/2011 | Collins et al. |
| 7,885,834 B2 | 2/2011 | Weiss |
| 7,885,837 B1 | 2/2011 | Martin |
| 7,890,402 B2 | 2/2011 | Golembiewski |
| 8,060,384 B2 | 11/2011 | Landry |
| 8,060,387 B2 | 11/2011 | Landry |
| 8,065,170 B2 | 11/2011 | Weiss |
| 8,095,397 B2 | 1/2012 | Gray et al. |
| 8,095,398 B2 | 1/2012 | Dellinger et al. |
| 8,103,529 B1 | 1/2012 | Liebmann et al. |
| 8,108,298 B2 | 1/2012 | Tatro et al. |
| 8,108,308 B2 | 1/2012 | Buerger |
| 8,112,345 B2 | 2/2012 | Mercier et al. |
| 8,126,746 B2 | 2/2012 | Harris et al. |
| 8,135,598 B2 | 3/2012 | Brown et al. |
| 8,145,509 B2 | 3/2012 | Lange et al. |
| 8,150,715 B1 | 4/2012 | Yee et al. |
| 8,160,902 B2 | 4/2012 | Spalding, Jr. |
| 8,160,946 B2 | 4/2012 | Roche et al. |
| 8,165,902 B2 | 4/2012 | Chien et al. |
| 8,175,900 B2 | 5/2012 | Danielsen |
| 8,175,947 B2 | 5/2012 | Michalowski et al. |
| 8,175,952 B2 | 5/2012 | Brooker et al. |
| 8,175,971 B1 | 5/2012 | Landry |

(56) References Cited

U.S. PATENT DOCUMENTS

| | | |
|---|---|---|
| 8,180,656 B2 | 5/2012 | Barron, Jr. et al. |
| 8,185,417 B1 | 5/2012 | Brown et al. |
| 8,204,767 B2 | 6/2012 | Dellinger et al. |
| 8,204,816 B2 | 6/2012 | Brodsky et al. |
| 8,209,197 B2 | 6/2012 | Tatro et al. |
| 8,209,199 B1 | 6/2012 | Abbs et al. |
| 8,224,673 B2 | 7/2012 | Michalowski et al. |
| 8,266,055 B2 | 9/2012 | Weiss et al. |
| 8,645,254 B2 | 2/2014 | Castille et al. |
| 8,666,783 B1 | 3/2014 | Meyer |
| 8,682,700 B2 | 3/2014 | Ferguson et al. |
| 8,731,976 B1 | 5/2014 | Schuver et al. |
| 8,805,733 B1 | 8/2014 | Hanzlik et al. |
| 8,909,540 B1 | 12/2014 | Greenbaum |
| 2001/0014873 A1 | 8/2001 | Henderson et al. |
| 2001/0037276 A1 | 10/2001 | Sherman |
| 2001/0049612 A1 | 12/2001 | Davis |
| 2002/0029158 A1 | 3/2002 | Wolff et al. |
| 2002/0035527 A1 | 3/2002 | Corrin |
| 2002/0052764 A1 | 5/2002 | Banks |
| 2002/0052784 A1 | 5/2002 | Sherwin |
| 2002/0052818 A1 | 5/2002 | Loveland |
| 2002/0059141 A1 | 5/2002 | Davies et al. |
| 2002/0069090 A1 | 6/2002 | De Grosz et al. |
| 2002/0077866 A1 | 6/2002 | Javerlhac |
| 2002/0077868 A1 | 6/2002 | Javerlhac |
| 2002/0087365 A1 | 7/2002 | Kavanaugh |
| 2002/0091539 A1 | 7/2002 | Yin et al. |
| 2002/0103678 A1 | 8/2002 | Burkhalter et al. |
| 2002/0103679 A1 | 8/2002 | Burkhalter et al. |
| 2002/0103733 A1 | 8/2002 | Barrington et al. |
| 2002/0116311 A1 | 8/2002 | Chalke et al. |
| 2002/0138386 A1 | 9/2002 | Maggioncalda et al. |
| 2002/0165740 A1 | 11/2002 | Saunders |
| 2002/0169715 A1 | 11/2002 | Ruth et al. |
| 2002/0184129 A1 | 12/2002 | Arena et al. |
| 2002/0188540 A1 | 12/2002 | Fay et al. |
| 2002/0194098 A1 | 12/2002 | Stiff et al. |
| 2002/0198802 A1 | 12/2002 | Koresko |
| 2002/0198827 A1 | 12/2002 | Van Leeuwen |
| 2003/0004844 A1 | 1/2003 | Hueler |
| 2003/0014285 A1 | 1/2003 | Richard |
| 2003/0014345 A1 | 1/2003 | Lim |
| 2003/0018498 A1 | 1/2003 | Banks |
| 2003/0033172 A1 | 2/2003 | Menke |
| 2003/0055763 A1 | 3/2003 | Linnenbringer et al. |
| 2003/0065539 A1 | 4/2003 | Kay |
| 2003/0088430 A1 | 5/2003 | Ruark |
| 2003/0088512 A1 | 5/2003 | Hoter-Ishay |
| 2003/0093303 A1 | 5/2003 | Pooler |
| 2003/0125982 A1 | 7/2003 | Ginsberg |
| 2003/0135396 A1 | 7/2003 | Javerlhac |
| 2003/0167220 A1 | 9/2003 | Schoen et al. |
| 2003/0172018 A1 | 9/2003 | Chen et al. |
| 2003/0187764 A1 | 10/2003 | Abbs et al. |
| 2003/0191672 A1 | 10/2003 | Kendall et al. |
| 2003/0195827 A1 | 10/2003 | Lichtig |
| 2003/0233301 A1 | 12/2003 | Chen et al. |
| 2004/0078244 A1 | 4/2004 | Katcher |
| 2004/0088201 A1 | 5/2004 | Lang |
| 2004/0088236 A1 | 5/2004 | Manning |
| 2004/0093242 A1 | 5/2004 | Cadigan et al. |
| 2004/0107134 A1 | 6/2004 | Nelson et al. |
| 2004/0111045 A1 | 6/2004 | Sullivan et al. |
| 2004/0117286 A1 | 6/2004 | Charnley, Jr. |
| 2004/0158517 A1 | 8/2004 | Mahaney et al. |
| 2004/0172350 A1 | 9/2004 | Atkinson et al. |
| 2004/0177022 A1 | 9/2004 | Williams et al. |
| 2004/0181436 A1 | 9/2004 | Lange |
| 2004/0199446 A1 | 10/2004 | Lange |
| 2004/0225536 A1 | 11/2004 | Schoen et al. |
| 2004/0249660 A1 | 12/2004 | Williams et al. |
| 2004/0267647 A1 | 12/2004 | Brisbois |
| 2005/0010453 A1 | 1/2005 | Terlizzi et al. |
| 2005/0015282 A1 | 1/2005 | Gutman et al. |
| 2005/0033611 A1 | 2/2005 | Phelps |
| 2005/0033612 A1 | 2/2005 | Donovan et al. |
| 2005/0038681 A1 | 2/2005 | Covert |
| 2005/0038682 A1 | 2/2005 | Gandee et al. |
| 2005/0060251 A1 | 3/2005 | Schwartz et al. |
| 2005/0071205 A1 | 3/2005 | Terlizzi et al. |
| 2005/0080739 A1 | 4/2005 | Sherzan et al. |
| 2005/0080741 A1 | 4/2005 | Sherzan |
| 2005/0144124 A1 | 6/2005 | Stiff et al. |
| 2005/0149425 A1 | 7/2005 | Hagan |
| 2005/0154658 A1 | 7/2005 | Bove et al. |
| 2005/0177509 A1 | 8/2005 | Mahaney et al. |
| 2005/0187840 A1 | 8/2005 | Stiff et al. |
| 2005/0187869 A1 | 8/2005 | Buerger |
| 2005/0216316 A1 | 9/2005 | Brisbois et al. |
| 2005/0234747 A1 | 10/2005 | Kavanaugh |
| 2005/0234821 A1 | 10/2005 | Benham et al. |
| 2006/0026036 A1 | 2/2006 | Mahmood |
| 2006/0041453 A1 | 2/2006 | Clark et al. |
| 2006/0041455 A1 | 2/2006 | Dehais |
| 2006/0059020 A1 | 3/2006 | Davidson |
| 2006/0080148 A1 | 4/2006 | Koresko |
| 2006/0080191 A1 | 4/2006 | Hinson |
| 2006/0085313 A1 | 4/2006 | Selby |
| 2006/0085338 A1 | 4/2006 | Stiff |
| 2006/0143055 A1 | 6/2006 | Loy et al. |
| 2006/0146951 A1 | 7/2006 | Chiu |
| 2006/0149651 A1 | 7/2006 | Robinson |
| 2006/0155631 A1 | 7/2006 | Kondaks |
| 2006/0161461 A1 | 7/2006 | Trani et al. |
| 2006/0206417 A1 | 9/2006 | Selby |
| 2006/0212380 A1 | 9/2006 | Williams et al. |
| 2006/0242052 A1 | 10/2006 | Long et al. |
| 2006/0271411 A1 | 11/2006 | Gregg et al. |
| 2007/0011089 A1 | 1/2007 | DeSchryver |
| 2007/0021986 A1 | 1/2007 | Cheung et al. |
| 2007/0033124 A1 | 2/2007 | Herr et al. |
| 2007/0038481 A1 | 2/2007 | Darr |
| 2007/0038487 A1 | 2/2007 | McCarthy |
| 2007/0050217 A1 | 3/2007 | Holden, Jr. |
| 2007/0061238 A1 | 3/2007 | Merton et al. |
| 2007/0078690 A1 | 4/2007 | Kohl |
| 2007/0094053 A1 | 4/2007 | Samuels |
| 2007/0094054 A1 | 4/2007 | Crabb |
| 2007/0094125 A1 | 4/2007 | Izyayev |
| 2007/0094127 A1 | 4/2007 | Izyayev |
| 2007/0100720 A1 | 5/2007 | Bonvouloir |
| 2007/0100726 A1 | 5/2007 | O'Flinn et al. |
| 2007/0136164 A1 | 6/2007 | Roti et al. |
| 2007/0143199 A1 | 6/2007 | Stiff et al. |
| 2007/0162365 A1 | 7/2007 | Weinreb |
| 2007/0168235 A1 | 7/2007 | Livingston et al. |
| 2007/0185741 A1 | 9/2007 | Hebron et al. |
| 2007/0214022 A1 | 9/2007 | Hagelman, Jr. et al. |
| 2007/0214071 A1 | 9/2007 | Stone |
| 2007/0250427 A1 | 10/2007 | Robinson |
| 2008/0010095 A1 | 1/2008 | Joyce |
| 2008/0021744 A1 | 1/2008 | Walker et al. |
| 2008/0027762 A1 | 1/2008 | Herzfeld et al. |
| 2008/0071661 A1 | 3/2008 | Jeudy et al. |
| 2008/0077450 A1 | 3/2008 | Klippel |
| 2008/0082371 A1 | 4/2008 | Phillips |
| 2008/0103839 A1 | 5/2008 | O'Brien |
| 2008/0109263 A1 | 5/2008 | Clark et al. |
| 2008/0109341 A1 | 5/2008 | Stiff |
| 2008/0133280 A1 | 6/2008 | Ziegler |
| 2008/0154637 A1 | 6/2008 | Capelli et al. |
| 2008/0215376 A1 | 9/2008 | Engelman |
| 2008/0270194 A1 | 10/2008 | West et al. |
| 2008/0270195 A1 | 10/2008 | Gottlieb |
| 2008/0281761 A1 | 11/2008 | Egan |
| 2008/0288297 A1 | 11/2008 | Koo |
| 2009/0030735 A1 | 1/2009 | Tatro et al. |
| 2009/0030736 A1 | 1/2009 | Tatro et al. |
| 2009/0030737 A1 | 1/2009 | Weiss |
| 2009/0030738 A1 | 1/2009 | Golembiewski |
| 2009/0030739 A1 | 1/2009 | Tatro et al. |
| 2009/0030740 A1 | 1/2009 | Robinson |
| 2009/0037231 A1 | 2/2009 | Menke |

(56) References Cited

U.S. PATENT DOCUMENTS

| | | |
|---|---|---|
| 2009/0063203 A1 | 3/2009 | Baiye |
| 2009/0089104 A1 | 4/2009 | Kondaks |
| 2009/0094069 A1 | 4/2009 | Castille et al. |
| 2009/0094070 A1 | 4/2009 | Harris et al. |
| 2009/0099979 A1 | 4/2009 | Raghavan et al. |
| 2009/0132300 A1 | 5/2009 | Weiss et al. |
| 2009/0132430 A1 | 5/2009 | Weiss |
| 2009/0171831 A1 | 7/2009 | Johnson et al. |
| 2009/0192829 A1 | 7/2009 | Long et al. |
| 2009/0192830 A1 | 7/2009 | Shemtob |
| 2009/0271222 A1 | 10/2009 | Marks et al. |
| 2009/0307016 A1 | 12/2009 | Gray et al. |
| 2009/0319303 A1 | 12/2009 | Harkensee et al. |
| 2010/0030583 A1 | 2/2010 | Fievoli et al. |
| 2010/0030584 A1 | 2/2010 | Guilbert et al. |
| 2010/0070310 A1 | 3/2010 | Ferguson et al. |
| 2010/0076792 A1 | 3/2010 | Mule et al. |
| 2010/0088114 A1 | 4/2010 | Carstens |
| 2010/0106532 A1 | 4/2010 | Brown et al. |
| 2010/0121659 A1 | 5/2010 | Hueler |
| 2010/0125465 A1 | 5/2010 | Hueler |
| 2010/0131423 A1 | 5/2010 | Meyer et al. |
| 2010/0138245 A1 | 6/2010 | Baiye |
| 2010/0145735 A1 | 6/2010 | Kendall et al. |
| 2010/0169128 A1 | 7/2010 | Berlin et al. |
| 2010/0169129 A1 | 7/2010 | Kavanaugh |
| 2010/0174565 A1 | 7/2010 | Weiss et al. |
| 2010/0185468 A1 | 7/2010 | Methot |
| 2010/0256995 A1 | 10/2010 | Oliver |
| 2010/0299160 A1 | 11/2010 | Roscoe et al. |
| 2011/0035239 A1 | 2/2011 | Scheinerman et al. |
| 2011/0066453 A1 | 3/2011 | Tatro et al. |
| 2011/0231211 A1 | 9/2011 | Griffin |
| 2011/0238453 A1 | 9/2011 | Roche et al. |
| 2011/0246245 A1 | 10/2011 | Coleman |
| 2011/0251859 A1 | 10/2011 | McCullough et al. |
| 2011/0264473 A1 | 10/2011 | Abreu et al. |
| 2011/0270637 A1 | 11/2011 | Tatro et al. |
| 2011/0282696 A1 | 11/2011 | Weiss et al. |
| 2012/0022899 A1 | 1/2012 | Landry |
| 2012/0072245 A1 | 3/2012 | Schiminovich |
| 2012/0084104 A1 | 4/2012 | Harkensee et al. |
| 2012/0095785 A1 | 4/2012 | Gore et al. |
| 2012/0101857 A1 | 4/2012 | Harris et al. |
| 2012/0116822 A1 | 5/2012 | Vasavada et al. |
| 2012/0158435 A1 | 6/2012 | Sexauer et al. |
| 2012/0209629 A1 | 8/2012 | Gordon et al. |
| 2012/0209631 A1 | 8/2012 | Roscoe et al. |
| 2014/0236637 A1 | 8/2014 | Tan-Torres, Jr. |
| 2014/0257875 A1 | 9/2014 | Schuver et al. |
| 2014/0278564 A1 | 9/2014 | Smith et al. |

FOREIGN PATENT DOCUMENTS

| | | |
|---|---|---|
| WO | WO 00/13118 | 3/2000 |
| WO | WO 00/14664 | 3/2000 |
| WO | WO 01/20512 | 3/2001 |
| WO | WO 01/88834 | 11/2001 |
| WO | WO 02/067096 | 8/2002 |
| WO | WO 04/099943 | 11/2004 |
| WO | WO 09/074878 | 6/2009 |

OTHER PUBLICATIONS

"Which Types of Insurance Do You Actually Need?" www.thirdage.com, 2006.

"New Variable Annuity Features Provide Value, but at a Cost", Located at http://www.insure.com/life/annuity/newerfeatures.html.

American Express Financial Group Launches Annuities Feature Designed to Help Investors "Fight Off the Bears and Run With the Bulls", Business Wire, May 3, 2005, 2 pgs.

Andrews, Listen Carefully and Sell More Annuities, Life & Health Insurance Sales, Indianapolis, vol. 140, Iss. 6, Nov.-Dec. 1997.

Anonymous "The White House: Remarks by the President in Social Security Forum Town Hall meeting—Part 1 of 3" Jul. 28, 1998M2 Presswire , p. N/A.

Anonymous, Rep Spotlight: Buddy White NCB Central Carolina Bank, Grenville, SC; Stepping in where half a dozen previous reps had failed, White says he does more teaching than selling across a vast territory, Bank Investment Marketing, p. 14 Jan. 1, 2002.

Brown, et al., "Joint Life Annuities and Annuity Demand by Married Couples", Journal of Risk and Insurance, 67, 4, 527, Dec. 2000.

Customer Action. Understanding Credit Card Costs. Dec. 27, 1996. p. 1-8. As viewed on May 4, 2011 at http://www.consumer-action.org/english/articles/understanding_credit_card_costs_tips_on_reducing_finance.

Cybulski "Getting out of Your Annuity," located at http://www.insure.com/life/annuity/basics.html.

Cybulski "The Ups and Downs of Immediate Variable Annuities," located at http://www.insure.com/life/annuity/getout.html.

Cybulski, "The Basics of Annuities," located at http://www.insure.com/life/annuity/immediate.html.

Debaise, Insurers Add a Twist to Annuity Offerings, The Wall Street Journal. online (www.WSJ.com), Jan. 5, 2006, 4 pgs.

Derivatives R US—Structured Notes, 1995.

Feldman, A. "Can This New 401(k) Save Retirement?," Business Week, Feb. 16, 2009.

Feldstein et al., Accumulated Pension Collars: A Market Approach to Reducing the Risk of Investment-Based Social Security Reform, National Bureau of Economic Research Working Paper 7861, Aug. 2000.

Financial Services Report, vol. 7, No. 10, May 9, 1990, Planco provides marketing services include colonial penn's popular annuity.

Fraser, Short Takes: Discover Brokerage Top 10 Stocks, American Broker, vol. 164 Issue 40 Mar. 1, 1999, 1 pg.

Friedberg, Ruth, Area experts offer advice on making investments work Daily Breeze (Cape Coral, FL, US) s A p 5 Publication Date: Mar. 8, 1994.

Golden Rule Insurance Company Receives Patent for Its Life/Long-Term Care Insurance Concept, PR Newswire, Jul. 15, 2003, 1 pg.

Griffin, Mark E "The federal income taxation of annuities: A success story" May 1995 Journal of the American Society of CLU & ChFC v49n3 pp. 44-56.

Hogan, 401(k) Provider Offers Guaranteed Income, www.ignites.com, Apr. 14, 2005, 2 pgs.

Huntley, Helen, Compare split annuity's package deal to other investments Series: On Money; [South Pinellas Edition] St. Petersburg Times. St. Petersburg, Fla.: Dec. 29, 2002. p. 3.H.

Ibbotson Seeks Partnerships for Combined Fund, Annuity, Defined Contribution & Savings Plan Alert, Euromoney Institutional Investor PLC, Nov. 10, 2006, 1 pg.

International Search Report dated Dec. 10, 2002 for Application No. PCT/US02/16471.

International Search Report dated May 4, 2004 for Application No. PCT/US03/05696.

Lavine, New York Life Annuity Builds on Two Popular Features: Expects New Product to Attract $200 Million Within a Year, Annuity Market News, Thomson Media Inc. Feb. 1, 2005, 2 pgs.

Lincoln Financial Group Enhances Variable Annuity Option Lincoln SmartSecurity(SM) Advantage to Offers Guaranteed Lifetime Income for Both Investor and Spouse, PR Newswire Association LLC, Nov. 6, 2006, 3 pgs.

Lincoln Financial Group's i4LIFE® Advantage Reaches Milestone as Elections Cross $1.0 Billion in 2006 Sales; Straight Record-Breaking Quarter, PR Newswire Association LLC, Nov. 6, 2006, 3 pgs.

Mason, Tom, Column, Fort Worth Star-Telegram, Texas, Oct. 20, 1998.

McEvoy, Replacing Insurance Policies Can Be Tricky, State Journal Register, Jan. 29, 1995, 2 pgs.

New York Life Brings Longevity Protection to Immediate Annuities: New Option Allows Clients to Customize retirement Payments According to Personal Needs and Life Events, Business Wire, Oct. 6, 2005, 2 pgs.

(56) References Cited

OTHER PUBLICATIONS

New York Life Introduces Lifestages® Elite Variable Annuity, New York Life, Oct. 1, 2003, 3 pages, http://www.newyorklife.com/cda/0,3254,12212,00.html.

New York Life Unveils Lifetime Income Product Featuring Liquidity, Inflation Protection, and Legacy Options, New York Life, 3 pages, http://www.newyorklife.com/cda/0,3254,12346,00.html.

Prudential Introduces Income Bridge Approach to Retirement Planning, Business Wire, Mar. 15, 2004, 1 pg.

Prudential Responds to 'Retirement Revolution' with Innovative, Patent-Pending Guaranteed-Income Product, Business Wire, Dec. 13, 2006, 3 pgs.

Prudential Retirement Expands Patent-Pending Income Bridge Approach(R) to Help Maximize Social Security Benefits to Retail Clients: New Report Unveiled on Helping to Maximize Social Security Benefits, Business Wire, 2006, 2 pgs.

Rutherford, Dan Retirees Sue Metlife, Ex-Agent in Tulsa, Tulsa World Jun. 11, 1996 03:10 E.T.

Smith et al., Annuity Tax and Planning Considerations, Journal of the American Society of CLU & ChFC, Bryn Mawr, vol. 46, Iss. 1, Jan. 1992.

Tergesen, New Wrinkles for Annuities, BusinessWeek, Jul. 24, 2006, 4 pgs.

Tregarthen, Double the Benefit with a Split Annuity, Life Association News, Washington, vol. 92, Iss. 9, Sep. 1997.

U.S. Appl. No. 09/595,898, filed Jun. 20, 2000.

www.annuityadvisors.com/FAQ/EquityIndexed.asp.

Fig. 2 (Benefit system) 10

SYSTEMS AND METHODS FOR PROVIDING A BENEFIT PRODUCT WITH PERIODIC GUARANTEED MINIMUM INCOME

RELATED APPLICATIONS

This patent application is a continuation of U.S. patent application Ser. No. 13/758,576 filed Feb. 4, 2013, which is continuation of U.S. patent application Ser. No. 11/065,441 filed on Feb. 25, 2005, now U.S. Pat. No. 8,370,242, which is a continuation-in-part of U.S. patent application Ser. No. 10/083,250 filed Feb. 27, 2002, now U.S. Pat. No. 8,781, 929, which is a continuation-in-part of U.S. patent application Ser. No. 09/876,053 filed Jun. 8, 2001, now U.S. Pat. No. 7,398,241, all of which are incorporated herein by reference in their entirety.

FIELD OF THE INVENTION

The present invention relates generally to systems and methods for providing a user with guaranteed minimum income payments and, more particularly, to systems and methods for guaranteeing minimum periodic income payments in association with a benefit product.

BACKGROUND OF THE INVENTION

Up until about 1870, more than half of the United States' adult workers were farmers. These adult workers were typically engaged in their occupations until their death or until their health prevented them from continuing their occupations. It was uncommon to have a prolonged retirement period before a worker's death.

After 1870, however, industry developed rapidly and the economy tended increasingly to be characterized by industrialization and urbanization. The result was that workers increasingly were employed in more industry-related jobs and became more dependent upon a continuing flow of monetary income to provide for themselves and their families. Additionally, the average life expectancies of workers began to increase significantly. It became more common for workers to retire from employment and to survive for longer periods of time following their retirements. Retirement programs began to take hold. The Social Security program was introduced in 1935 and had an old age insurance component which provided a lump sum benefit for workers at age 65. At that time, the average life expectancy of a worker was 68. Currently, however, half of male workers reaching age 65 can expect to still be alive at age 82 and half of female workers reaching age 65 can expect to be alive at age 86. The Social Security program is not keeping pace with such changes. The number of employees entering the workforce has been less than the number of new retirees for the last several years and this trend is expected to increase as the "Baby Boomers" age. The Social Security Administration ("SSA") projects a shortfall in its trust fund which provides benefits to retirees beginning in 2013. The SSA believes that an immediate and permanent increase of Social Security payroll taxes is necessary in order to enable it to pay for the full amount of old age benefits it currently provides retirees. Now, employees and employers contribute approximately 12.4 percent of salaries to the Social Security trust fund. The SSA projects that contributions must be increased to at least 38 percent in order for its trust fund to remain fully funded. Therefore, it is becoming increasingly uncertain whether the Social Security program will continue to remain viable until the time that today's workers are ready to retire. Moreover, many retirees have found that the amount of retirement benefits to which they are entitled under the Social Security program is insufficient to enable them to maintain a desired level of comfort in their retirement. They have found a need to supplement such Social Security benefits with income from other sources.

In addition to the institution of the Social Security program in the 1930s, beginning in the early 1900s, it became increasingly more common for employers to provide their workers, or employees, with some sort of retirement benefits or pensions. These retirement benefits or pensions were originally designed, in part, to reward an employee for his/her long career with a company and to help provide an income once such employee retired. Such retirement benefits or pension plans therefore required minimum periods of employment before an employee's entitlement to the pension amount became vested. However, many such retirement benefits or pensions are not portable. In other words, if an employee leaves the employ of an employer, that employee may lose all entitlement to such retirement benefit or pension if the employee terminates his/her employment prior to the expiration of the vesting period. This was not a problem when employers first instituted such retirement benefits or pension plans as employees tended to remain employed with one employer for their entire career until they retired. However, in today's mobile society, employees do not tend to remain employed by one employer for their entire careers. Many employees therefore lose some or all of their projected retirement benefits which may have accrued during their employ by their employers when they leave the employ of such employers.

Furthermore, in addition to the trend of a more mobile society and an increased level of employment changes, many employers are decreasing the numbers of their employees and are instead increasingly turning to non-employee labor in part to cut expenses resulting from employee benefits such as costs related to funding employee retirement plans. Thus, many individuals in the workforce today are technically not considered "employees" but instead are independent contractors for whom employment benefits such as retirement benefits are not provided. Additionally, many employers are ceasing to offer defined benefit plans altogether because of the costs. In fact, according to statistics published by the Pension Benefit Guaranty Corporation, defined benefit pension plans of employers have decreased by more than 60 percent since 1985, with the number of U.S.-based employers that offer such defined benefit pension plans decreasing from 114,000 in 1985 to less than 40,000 in 1999. Only 21.3 percent of working family heads are currently covered by an employer-funded defined retirement benefit or pension plan.

Because of the decrease in the number of employers that offer defined retirement benefit pension plans, the decrease in the number of workers entitled to employer-funded retirement benefits and also because of the increased mobility of the workforce resulting in the loss of such employer-funded benefits, many workers have started to fund their own retirement savings plans. Tax laws have enabled workers to realize tax benefits from deferring their income by putting amounts from their paychecks into such retirement savings plans. Increasingly, such employee-self-funded retirement savings plans are becoming the primary sources of income on which employees survive following retirement.

However, one disadvantage of the increased reliance upon employee-self-funded retirement savings is that these plans do not provide a level of retirement income that is guaranteed for the employee. In addition, many employees do not have any idea of an amount required to be saved in order to achieve a desired level of income to ensure a comfortable lifestyle upon their retirement. Thus, they do not contribute a sufficient amount of their salaries towards such retirement savings to provide an adequate income level to maintain the standard of living they desire upon retirement. Based on the results of the Retirement Confidence Survey sponsored by the Employee Benefits Research Institute (EBRI), the American Savings Education Council (ASEC), and Matthew Greenwald and Associates, 22 percent of all employed adult workers have saved less than $10,000 towards retirement, 50 percent have saved less than $50,000 and only 25 percent of adult workers over the age of 55 have accumulated more than $100,000.

Retirement income needs may increase in the event such retirees suffer from health-related problems. In fact, many employees today express concern that they will not have adequate funds saved to provide for themselves during their retirement in the event they suffer health-related problems after they retire. They are currently seeking some means to ensure a higher level of income saved for such crises.

Employees often do not participate in their employer-sponsored retirement savings plans, which will increase the level of their savings through interest income or a return on investment. Also, many individuals lack the sophistication needed to determine the appropriate type of investment vehicle which will offer them a high return on their investment but which is also secure enough so that their savings are not placed at risk by a high-risk type of investment vehicle.

However, there are a wide variety of benefit products available to an interested individual. For purposes of explanation, available benefit products may take the form of an annuity, or an "annuity structure", or a "mutual fund with an insurance guarantee". With regard to an annuity, an annuity might be characterized as a contract in which an individual or other entity agrees to pay a premium, in the form of periodic payments or a lump sum, to an insurance company or other issuing entity. The time period in which these premiums are paid may be characterized as an "accumulation phase". In exchange for the payment of the premiums, the individual or other entity receives a stream of income from the insurance company over a period of time. The period of time in which this stream of income is received may be characterized as the "payout phase". The payout phase might be a set number of years or life, for example.

However, there are limitations with most conventional annuities and other benefit products. In particular, no payout phase income guarantees accrue during the accumulation phase. Since there is no guarantee during the accumulation phase, it is impossible to gauge with certainty the income that will be generated throughout the payout phase. Accordingly, it would be desirable to reduce the uncertainty associated with a benefit product by providing a guaranteed minimum income payout at the times premiums are paid during the accumulation phase. Further, it would be desirable to provide a system to effectively implement the method of providing a guaranteed minimum income payout. The systems and methods of the invention address these desirabilities, as well as others.

BRIEF SUMMARY OF THE INVENTION

The invention provides systems, and methods of using the systems, implementing a benefit product with a guaranteed minimum income, wherein payment into the benefit product securing the guaranteed minimum income for a payout phase of the benefit product following an accumulation phase of the benefit product. The system comprises an income recordkeeper interfacing with a plurality of savings recordkeepers, the income recordkeeper including (1) an income recordkeeper interface portion that inputs attributes to the benefit product funded by payments from a plan associated with the benefit product; and (2) an income recordkeeper record keeping system that implements the benefit product, the income recordkeeper record keeping system being in communication with the income recordkeeper interface portion, the income recordkeeper record keeping system: (a) monitoring transactions to or from the benefit product; and (b) determining, based on the transactions, a guaranteed minimum income associated with participation in the benefit product, the guaranteed minimum income being an amount that may be paid from the benefit product beginning on a future start date. The system further includes the plurality of savings recordkeepers, wherein each of the savings recordkeepers includes a savings recordkeeper record keeping system, the savings recordkeeper record keeping system outputting the attributes to the benefit product to the income recordkeeper interface portion, so as to be input to the income recordkeeper record keeping system, wherein records of the plan being maintained by the savings recordkeeper, the records containing the attributes; and wherein each of the savings recordkeepers are unaffiliated third parties with respect to their relationship with the income recordkeeper.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF THE INVENTION

Hereinafter, aspects of the inventive systems and methods in accordance with various embodiments of the invention will be described. As used herein, any term in the singular may be interpreted to be in the plural, and alternatively, any term in the plural may be interpreted to be in the singular. The systems and methods of the invention are directed to the above stated limitations, as well as other limitations, that are present in conventional products.

The innovation described herein provides a financial structure, and a system to implement the financial structure, to fill an emerging market need for a retirement income product that can be funded from a plan, in accordance with one embodiment of the invention, without requiring substantial changes to the existing support infrastructure of the plan. The invention further relates to, and provides the technical effect of offering a system that affords, an income recordkeeper interfacing with a plurality of savings recordkeepers to implement a benefit product with a guaranteed minimum income feature.

Hereinafter, various aspects of the systems and methods of the invention will be described. In accordance with one aspect of the invention, the structure of the invention provides a benefit product that is associated with an annual guaranteed minimum income. For example, the benefit product may be in the form of a "retirement income guarantee", i.e., a guarantee associated with a retirement date. The innovation may be implemented by what is herein characterized as an insuring entity, and more specifically an income recordkeeper (disposed in an insuring entity). In particular, the insuring entity may be operating in the role of an underwriter of a group annuity working with a plan sponsor, plan administrator, third party administrator or other recordkeeper supporting employer or other group plans, hereinafter referred to simply as a savings recordkeeper.

As explained herein, the invention is illustratively described as providing "annual guaranteed minimum income, what is herein referred to as an "annual guaranteed minimum income", as well as utilizing a guaranteed "annual" income factor. However, it is appreciated that the invention does not need to be implemented on an annual, i.e., yearly basis. The invention might be implemented on a monthly basis, or utilize any other periodicity. However, the invention will typically rely on some frequency as determined by the attributes of the particular product. For example, factor tables used in the invention are typically coordinated by some frequency. Further, it is noted that payments may be made at any desired frequency, as agreed upon by the parties.

Figure 1:
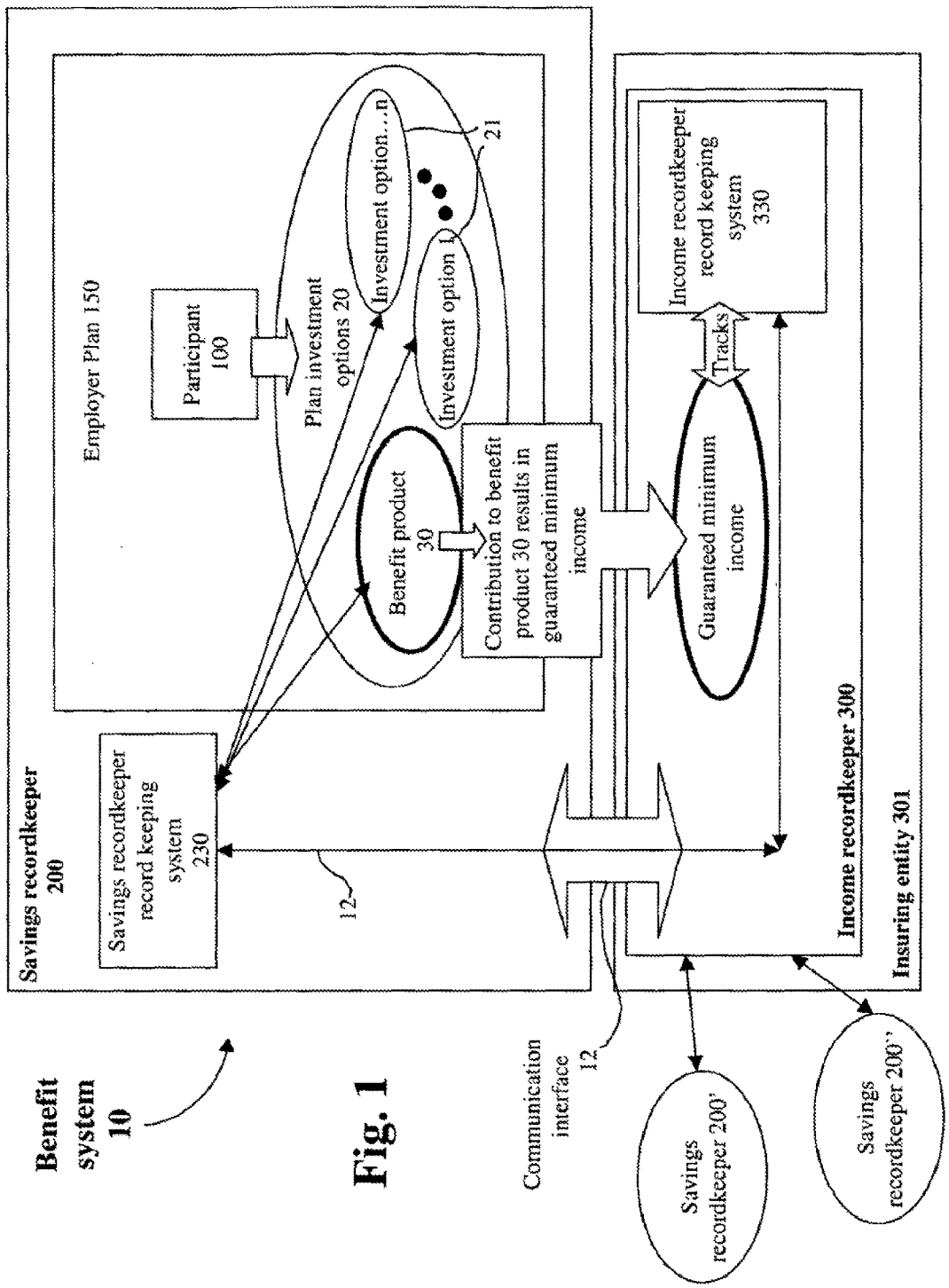
FIG. 1 is a block diagram showing aspects of a scalable benefit system having an income recordkeeper interacting with a plurality of savings recordkeepers in accordance with one embodiment of the invention.

FIG. 1 is a block diagram showing aspects of a benefit system 10 in accordance with one embodiment of the invention. The system to support the benefit system 10 is maintained in part by an income recordkeeper 300 and in part by a plurality of savings recordkeepers (200, 200', 200"). As shown in FIG. 1, the income recordkeeper 300 may well be disposed in an insuring entity 301. As is appreciated, the insuring entity 301 performs a variety of operations other than the processing of the income recordkeeper 300, i.e., operations not related to the present invention.

The benefit system 10 includes an employer plan 150. For example, the employer plan 150 might be in the form of a tax qualified plan. The benefit product 30 may be funded by payments from the employer plan 150 on behalf of a representative participant 100. Funding may also come directly from the participant 100. As should be appreciated, the benefit system 10 of the invention may be used by a substantial number of participants 100 associated with a particular employer plan 150. Further, as shown in FIG. 1, the income recordkeeper 300 interfaces with a plurality savings recordkeepers (200, 200', 200") administering respective employer plans 150.

In further explanation of FIG. 1, the employer plan 150 includes a plurality of plan investment options 20. In accordance with one embodiment of the invention, one of those plan investment options 20 is a benefit product 30. The benefit product 30 is the investment option, which the participant 100 selects, to secure an annual guaranteed minimum income. The participant 100 may of course invest in other plan investment options 21. However, those other investment options 21 are not associated with an annual guaranteed minimum income in this example.

As shown in FIG. 1, the savings recordkeeper 200 and the income recordkeeper 300 have respective record keeping systems. That is, the savings recordkeeper 200 has a savings recordkeeper record keeping system 230, and the income recordkeeper 300 has an income recordkeeper record keeping system 330. The savings recordkeeper record keeping system 230 and the income recordkeeper record keeping system 330 communicate via a communication interface 12, as well as via other processing components, as discussed below.

The savings recordkeepers (200', 200") also administer a respective employer plan 150 and maintain respective savings recordkeeper record keeping systems. That is, the structure of the savings recordkeeper 200 as described herein is illustrative of the structure of the savings recordkeepers (200', 200"). Collectively, the savings recordkeepers (200, 200', 200") and the income recordkeeper 300 form what might be characterized as a "hub and spoke" arrangement, as discussed in detail below. This arrangement provides for implementation of a guaranteed minimum income product by the income recordkeeper 300 vis-à-vis a plurality of savings recordkeepers 200.

Figure 2:
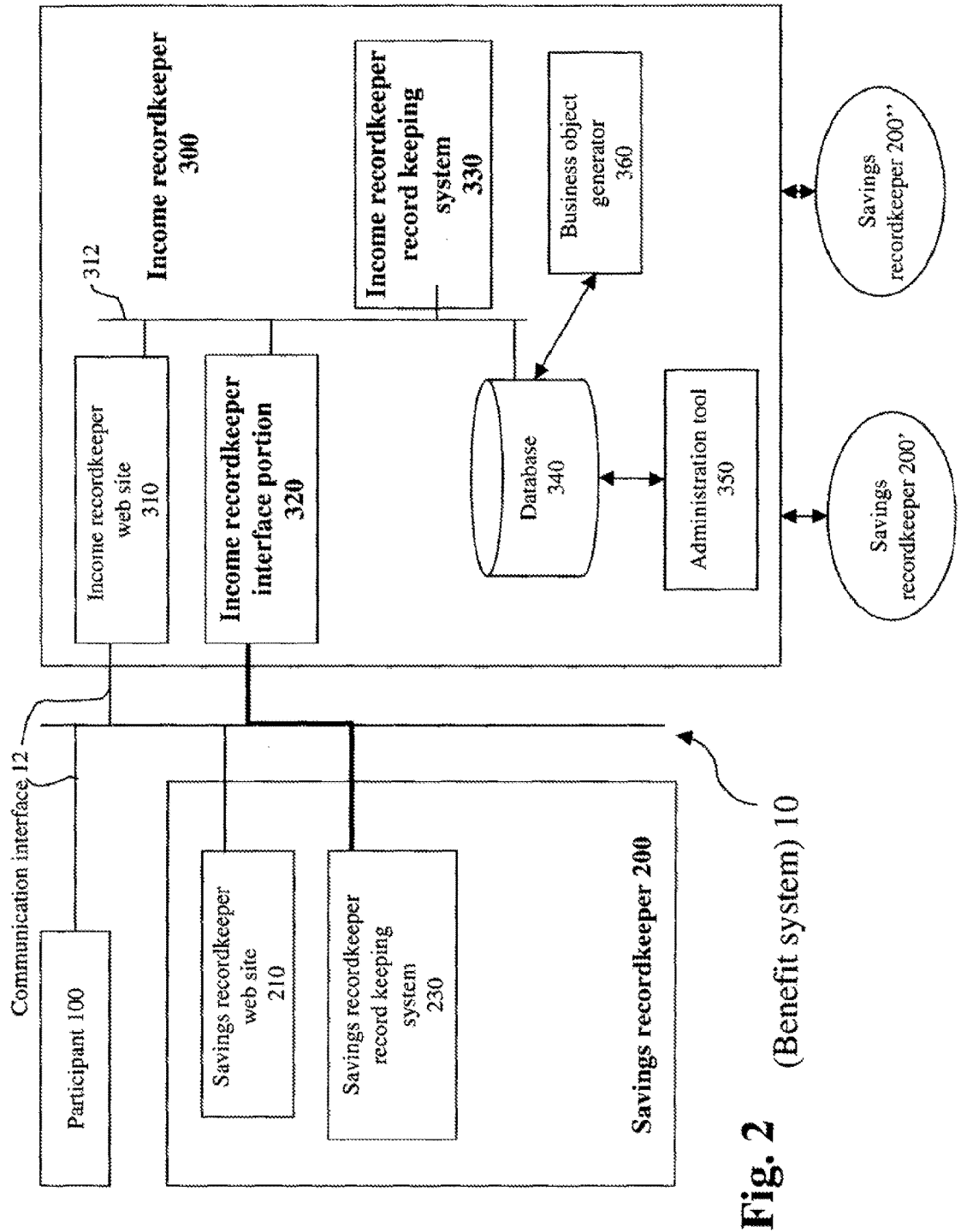
FIG. 2 is a block diagram showing further aspects of the benefit system of FIG. 1 in accordance with one embodiment of the invention.

FIG. 2 is a block diagram showing further aspects of the benefit system 10. The benefit system 10 includes various processing components associated with the income recordkeeper 300, as well as with each savings recordkeeper (200, 200'; 200") associated with the income recordkeeper 300.

As noted above, the benefit system 10 provides the ability for the income recordkeeper 300 to interact with a plurality of savings recordkeepers 200 using what might be characterized as a hub and spoke arrangement. Further, the inventive system is scalable to allow additional savings recordkeepers 200 to be added. As also noted above, the benefit system 10 includes a communication interface 12 to allow communication between the income recordkeeper 300 and the various savings recordkeepers 200. The communication interface 12 also allows for communication between participants 100 vis-à-vis the savings recordkeeper 200 and the income recordkeeper 300.

In accordance with the embodiment of FIG. 2, the savings recordkeeper record keeping system 230 interfaces with the income recordkeeper record keeping system 330 via an income recordkeeper interface portion 320. However, the communication interface 12 may be used to allow communication between any of the components of the income recordkeeper 300 with any of the components of the savings recordkeeper 200. The communication interface 12 might be in the form of a network, intranet or Internet connection, for example, or any other suitable form of communication.

Accordingly, each savings recordkeeper 200 includes a savings recordkeeper record keeping system 230 in accordance with this embodiment of the invention. The savings recordkeeper record keeping system 230 maintains various data associated with the maintenance of the employer plan 150, which is maintained by each savings recordkeeper 200.

In operation of the benefit system 10, the income recordkeeper interface portion 320 inputs and processes data from each of the savings recordkeepers (200, 200' 200") and specifically the respective savings recordkeeper record keeping systems 230, in accordance with one embodiment of the invention. This data is then output from the income recordkeeper interface portion 320 to the income recordkeeper record keeping system 330. The data is needed to implement the benefit product 30. The data may be input from the savings recordkeeper record keeping system 230 to the income recordkeeper record keeping system 330 in some periodic manner. Accordingly, the data might be input in a batched manner. Alternatively, the data might be input in real time, i.e., at essentially the same time as the data is updated in the savings recordkeeper record keeping system 230.

As shown in FIG. 2, the income recordkeeper 300 also includes a database 340. The database 340 may support a wide variety of data needs of the income recordkeeper 300 associated with implementation of the inventive benefit product. The income recordkeeper 300 further includes an administration tool 350 and a report generator 360. Further details of the administration tool 350 and the report generator 360 are discussed below.

The income recordkeeper record keeping system 330 performs a variety of processes as described herein. In accordance with one embodiment of the invention, the income recordkeeper record keeping system 330 monitors payments paid to the particular benefit product 30. The income recordkeeper record keeping system 330 determines, based on the payments, an annual guaranteed minimum income associated with payments into the benefit product 30. The annual guaranteed minimum income is an amount that will be paid to the participant after a future start date, i.e., marking the end of the accumulation phase.

Hereinafter, further aspects of the capabilities of the income recordkeeper 300 will be described. The income recordkeeper, and specifically, the income recordkeeper record keeping system 330 in accordance with one embodiment of the invention, is provided with the capability to maintain participant level records for the benefit product 30. This in turn allows participant inquiry, hypothetical illustrations, tracking of a minimum income guarantee, and investment option level participant statements, for example. These capabilities are provided to a participant through the processing of the income recordkeeper record keeping system 330, and through the interface provided by the income recordkeeper web site 310. In the invention, these capabilities are provided without the income recordkeeper 300 serving in the role of a savings recordkeeper 200. In accordance with one aspect of the invention, two primary balances are tracked by the income recordkeeper record keeping system 330. These two balances include (1) the total account balance associated with a particular participant 100; and (2) the annual guaranteed minimum income associated with each participant 100.

In order to accurately monitor the annual guaranteed minimum income associated with the benefit product 30, the income recordkeeper tracks the amount of annual guaranteed minimum income purchased on behalf of a participant with each contribution to the benefit product 30, as adjusted for any withdrawals. In the benefit system 10 in accordance with one embodiment of the invention, the income recordkeeper 300 is not responsible for any of the regulatory, compliance or tax reporting issues related to the plan. Rather, that responsibility lies with the savings recordkeeper 200. However, the income recordkeeper 300 does "shadow" the participant 100 accounts, as maintained by the savings recordkeeper 200, so as to effect operation of the income recordkeeper record keeping system 330 and the implementation of the benefit product associated with the annual guaranteed minimum income.

Through the interface of the savings recordkeeper record keeping system 230 (in the savings recordkeeper 200) and the income recordkeeper record keeping system 330, the savings recordkeeper 200 transmits data to the income recordkeeper 300 daily, or on some other periodic basis, so as to keep participant records of the income recordkeeper 300 synchronized with those of the savings recordkeeper 200.

In the benefit system 10 various data from the savings recordkeeper record keeping system 230 is output to the income recordkeeper record keeping system 330. However, according to one aspect of the invention, the data needed from the savings recordkeeper 200 (for the income recordkeeper 300 to implement the benefit product 30) is no more than the savings recordkeeper 200 would normally maintain with other benefit products (i.e., benefit products not having a guaranteed minimum income). To explain further, in practice of the invention, it is indeed needed that the savings recordkeeper 200 generate extracts from the data structure (maintained in the savings recordkeeper record keeping system 230) and output those data extracts to the income recordkeeper 300. However, it is envisioned that such output of data from the savings recordkeeper record keeping system 230 to the income recordkeeper 300 will cause minimal if any disruption to operations of the savings recordkeeper 200. Further, in accordance with one embodiment of the invention, the savings recordkeeper 200 performs no modification of the data (in the savings recordkeeper record keeping system 230) prior to sending that data to the income recordkeeper 300, but rather simply bundles that data in some suitable manner prior to forwarding to the income recordkeeper 300. The income recordkeeper interface portion 320 performs any needed conversion/modification of the data received from the savings recordkeeper record keeping system 230.

Through the utilization of the hub and spoke structure disclosed herein, the income recordkeeper 300 can support multiple savings recordkeepers 200 from a single system 300. This may be performed while maintaining the flexibility to accommodate the often unique aspects of particular savings recordkeepers 200, including individual plans and plan administrators, for example.

To explain further, in accordance with one embodiment of the invention, the income recordkeeper interface portion 320, working with the income recordkeeper record keeping system 330, provides a unique interface with savings recordkeepers 200 who are providing plan record keeping services. The software embodied in the income recordkeeper interface portion 320 may perform multiple functions. Specifically, the income recordkeeper interface portion 320 reformats data provided by the savings recordkeepers 200 to be compatible with the database 340. Further, the income recordkeeper interface portion 320 enables one standardized process to interoperate with multiple otherwise incompatible systems. Further, the income recordkeeper interface portion 320 synchronizes each of the data files received from the savings recordkeepers 200 for integration into the database and other internal processing systems maintained by the income recordkeeper 300. Also, the income recordkeeper interface portion 320 schedules receipt and delivery of data required to be received from and delivered to the savings recordkeepers 200 within the scalable hub and spoke architecture.

The disclosed benefit system 10 allows a mutual fund-like interface to be maintained, minimizing impact on the savings recordkeepers 200 to implement a group annuity (i.e., one possible implementation of the benefit product), for example, while enabling the income recordkeeper 300 to manage the benefit product, without the burden and expense of a complete administrative system. The provided arrangement allows the record keeping responsibility and regulatory compliance aspects to remain with the savings recordkeeper 200, while keeping aspects of the benefit product 30 (and processes associated with the benefit product) proprietary, if so desired. For example, the specific algorithm used to calculate the annual guaranteed minimum income used by the income recordkeeper 300 might be kept proprietary.

Hereinafter, aspects of the calculation of the annual guaranteed minimum income will be described in further detail. In accordance with one embodiment of the invention, the system of the income recordkeeper receives participant level trade transactions from the savings recordkeeper 200. Using plan specific factors, i.e., factors that are specific to a particular plan 150, the income recordkeeper record keeping system 330 calculates the annual guaranteed minimum income associated with each trade transaction. The income recordkeeper record keeping system 330 stores this data in the database 340 for multiple purposes. These purposes may include, for example, managing corrections, projecting future annual guaranteed minimum income payments, supporting "what if" analysis and supporting actual payments. These capabilities provide an effective hub and spoke arrangement by which data from the savings recordkeepers' record keeping systems 230 may be aggregated based on respective participants so as to determine annual guaranteed minimum income associated with each participant.

As described herein, monies paid into the benefit product 30 during the accumulation phase on behalf of a participant 100 are tracked by the income recordkeeper 300. As a result of such monies paid into the benefit product 30, the participant 100 receives annual guaranteed minimum income. In order to calculate the income guarantee amount, separate guaranteed annual income factors are established for each age, as determined by the benefit product, within the particular plan's eligible age range, in accordance with one embodiment of the invention. The guaranteed annual income factor by age is the result of a calculation that may take into account a variety of factors. For example, these factors may include the specified start age when income payments are assumed to commence (e.g., a retirement age), the annuity payout form of income payments (e.g. life with 20 years period certain), a mortality guarantee during the payout phase that is tied to the current age for which the guaranteed annual income factor is being determined, and an interest rate that varies with the number of years until annual income payments are assumed to begin. However, other factors may of course be considered as is desired. The guaranteed annual income factors, for each plan, may be applied utilizing a factor table, in accordance with one embodiment of the invention. For example, the factor table may list a contribution age of a participant vis-à-vis the particular guaranteed annual income factor that is associated with that contribution age. It is appreciated that a table per se need not be used. That is, other equivalent processing methodologies might also be used.

Accordingly, in one embodiment of the invention, each dollar contribution made by a participant 100 will purchase a dollar amount of guaranteed annual income as adjusted by applying the guaranteed annual income factor for the applicable age (as defined by the benefit product, herein referred to as "age") at which the contribution was made. The guaranteed annual income factor for an age is applied to all contributions made by or on behalf of the participant 100 while the participant is at that specified age. Once the age of the participant changes, as determined by the benefit product, the guaranteed annual income factor will adjust accordingly. The total amount of annual guaranteed minimum income that has been purchased for the participant, as adjusted for withdrawals over his years of participation in the plan, becomes the annual guaranteed minimum income benefit for the participant.

Hereinafter, aspects of the inventive systems and methods will be described with further reference to FIG. 2.

As shown in FIG. 2 and described above, the benefit system 10 includes the savings recordkeeper 200 and the income recordkeeper 300. Each of the savings recordkeepers 200 and an income recordkeeper 300 communicate with a participant 100, who participates in the benefit system 10. This communication may be performed over a suitable communication interface 12, as discussed above, in accordance with one embodiment of the invention. The communication interface 12 might be in the form of the Internet, intranet, or some other network arrangement, for example.

So as to effect this communication with a participant 100, the savings recordkeeper 200 includes a savings recordkeeper web site 210, as shown in FIG. 2. The savings recordkeeper web site 210 allows participants 100 access to various data that is maintained by the savings recordkeeper 200. In particular, the savings recordkeeper web site 210 provides access to information relating to the benefit product held by a participant 100, as well as other plan investment options 20, which are available to the participant 100.

The income recordkeeper 300 also includes a web site. That is, the income recordkeeper 300 includes an income recordkeeper web site 310. The income recordkeeper web site 310 allows participants 100 to access a variety of information maintained by the income recordkeeper 300, i.e., such as accounts of the participants 100 and in particular information associated with their annual guaranteed minimum income. Access by the participant 100 via the savings recordkeeper web site 210 and the income recordkeeper web site 310 may be controlled in any known manner, i.e., such as by the use of usernames and passwords, for example. However, it should be appreciated that the particular arrangement of a web site is not required for implementation of the benefit system 10. That is, any suitable communication interface might be used to allow the participant 100 to interact with the savings recordkeeper 200 and/or the income recordkeeper 300. For example, possible delivery mechanisms include mailed reports and phone.

As shown in FIG. 2, the income recordkeeper interface portion 320, the income recordkeeper record keeping system 330 and the data base 340 are separate components in the income recordkeeper 300. However, it is appreciated that in a different embodiment, the particular arrangement may be different. For example, the income recordkeeper interface portion 320 and the data base 340 might be disposed in the income recordkeeper record keeping system 330, for example.

Figure 3:
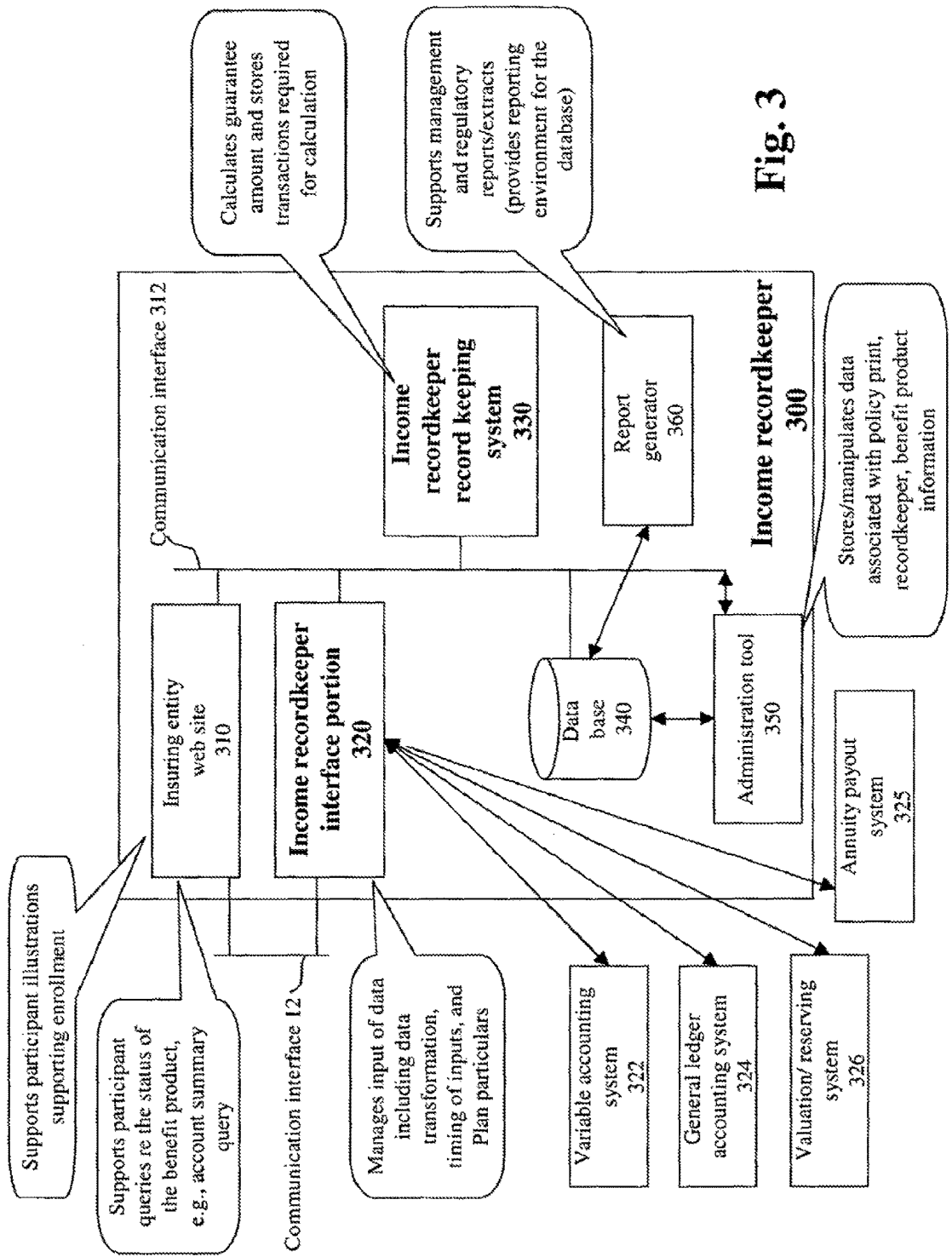
FIG. 3 is a block diagram showing further details of the income recordkeeper of FIG. 2 in accordance with one embodiment of the invention.

FIG. 3 is a block diagram showing further details of the income recordkeeper 300 of FIG. 2 in accordance with one embodiment of the invention. In particular, FIG. 3 shows various aspects of the various components of the income recordkeeper 300.

The income recordkeeper web site 310 may provide a wide range of capabilities, in addition to mere access to data. The income recordkeeper web site 310 may provide a participant with illustrations supporting enrollment in the benefit product 30. For example, the income recordkeeper web site 310 might provide the participant with a calculator such that the participant might calculate the timing and amount of contributions needed to be input into the benefit product so as to result in a desired minimum, i.e., a minimum income guarantee. Also, the income recordkeeper web site 310 may be provided to support participant queries regarding the status of the benefit product 30, e.g., to support an account summary query.

As discussed above, the income recordkeeper interface portion 320 is provided in the income recordkeeper 300 to handle the input of data from the savings recordkeeper record keeping system 230. In particular, the income recordkeeper interface portion 320 may manage input of data including data transformation, timing of inputs, and company particulars. The income recordkeeper interface portion 320 may input a variety of other data as needed, and interface with the income recordkeeper record keeping system 330 so as to use the data in operation of the benefit system 10.

Further, as shown in FIG. 3, it is appreciated that the income recordkeeper interface portion 320 may be in communication with other systems so as to input needed data from the other systems. That is, for example, the income recordkeeper interface portion 320 may be in communication with a variable accounting system 322, a general ledger accounting system 324, an annuity payout system 323 (in the case that the benefit product 30 is an annuity), and/or an actuarial valuation and reserving system 326.

The income recordkeeper 300 also includes the administration tool 350. Illustratively, the administration tool 350 may store and/or manipulate data associated with the printing of a policy, particulars of a savings recordkeeper, and/or various product information In accordance with one embodiment of the invention, the income recordkeeper 300 also includes a report generator 360. The report generator 360 is in communication with the database 340 so as to provide a variety of report generation and processing. For example, the report generator 360 supports management and regulatory reports/extracts. In general, the report generator 360 provides for a reporting environment for the database 340. As described above, the database 340 may contain any of a wide variety of data used in the income recordkeeper 300, and the report generator 360 may report out that information as needed.

Figure 4:
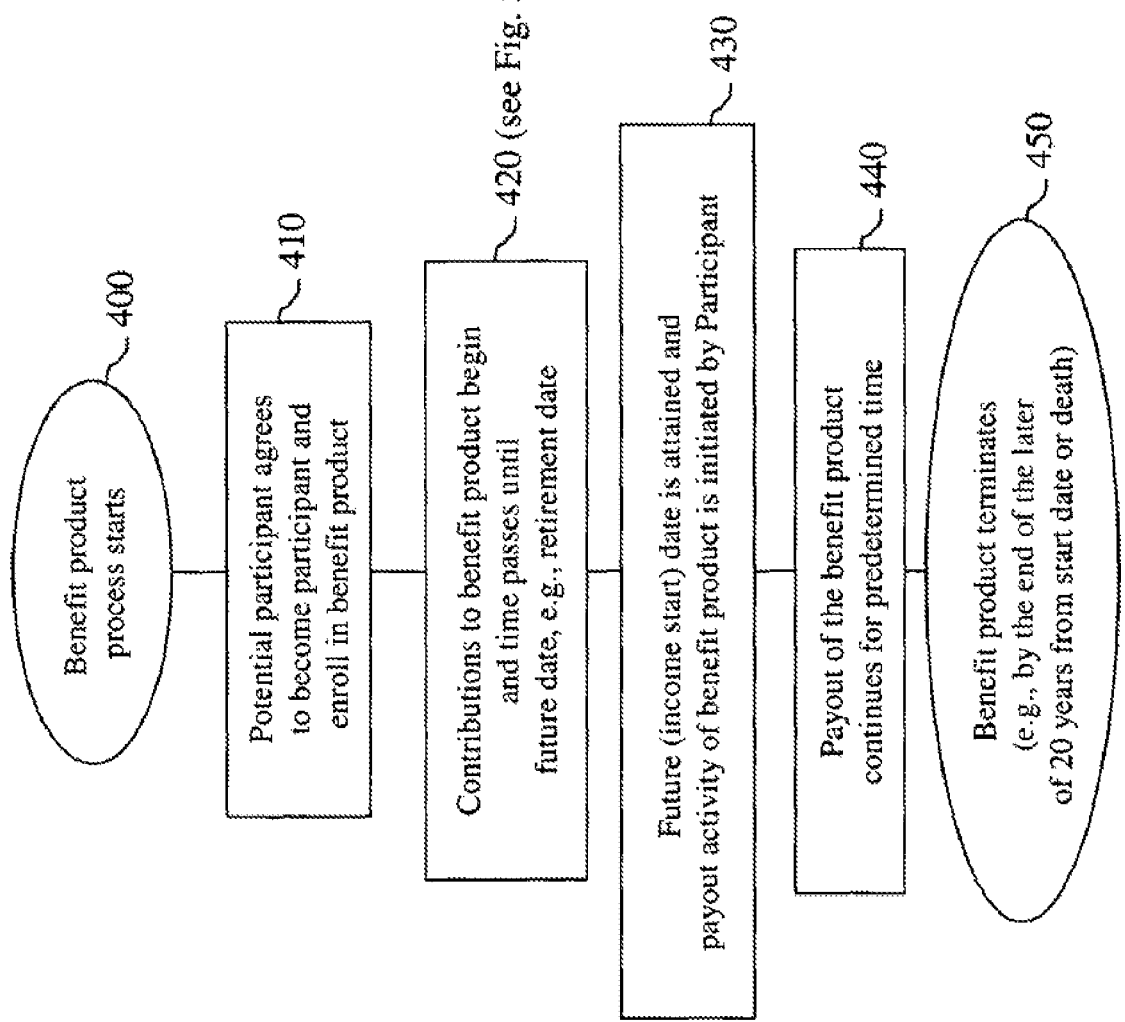
FIG. 4 is a flowchart showing a process of the benefit system in accordance with one embodiment of the invention.

Hereinafter, further aspects of the invention will be described with reference to FIG. 4. FIG. 4 is a flowchart showing a process performed by the benefit system 10 in accordance with one embodiment of the invention. As shown, the process starts in step 400 and passes to step 410.

In step 410, a potential participant is presented with the option to participate in a benefit product. That is, the participant 100 may be presented with a number of plan investment options 20, and in this example, agrees to enroll in the benefit product 30, i.e., the particular benefit product 30 that results in an annual guaranteed minimum income. After step 410, the process passes to step 420.

In step 420, contributions to the benefit product 30 are begun on behalf of the participant. Thereafter, time passes until the end of the accumulation phase. For example, a retirement date might mark the end of the accumulation phase. As described below, FIG. 5 is a flowchart showing further details of step 420.

After step 420, the process passes to step 430. In step 430, the payout start date is attained and the participant 100 requests that payout activity begin. That is, the payout phase of the benefit product is initiated. After step 430, the process passes to step 440. In step 440, payout of the benefit continues for some predetermined time. This predetermined time might be the later of 20 years from the income start date, death of the participant, or any other agreed upon length of time.

After step 440, the process passes to step 450. In step 450, the benefit product terminates as a result of the occurrence of the payout end date, i.e., the end of the payout phase.

Figure 5:
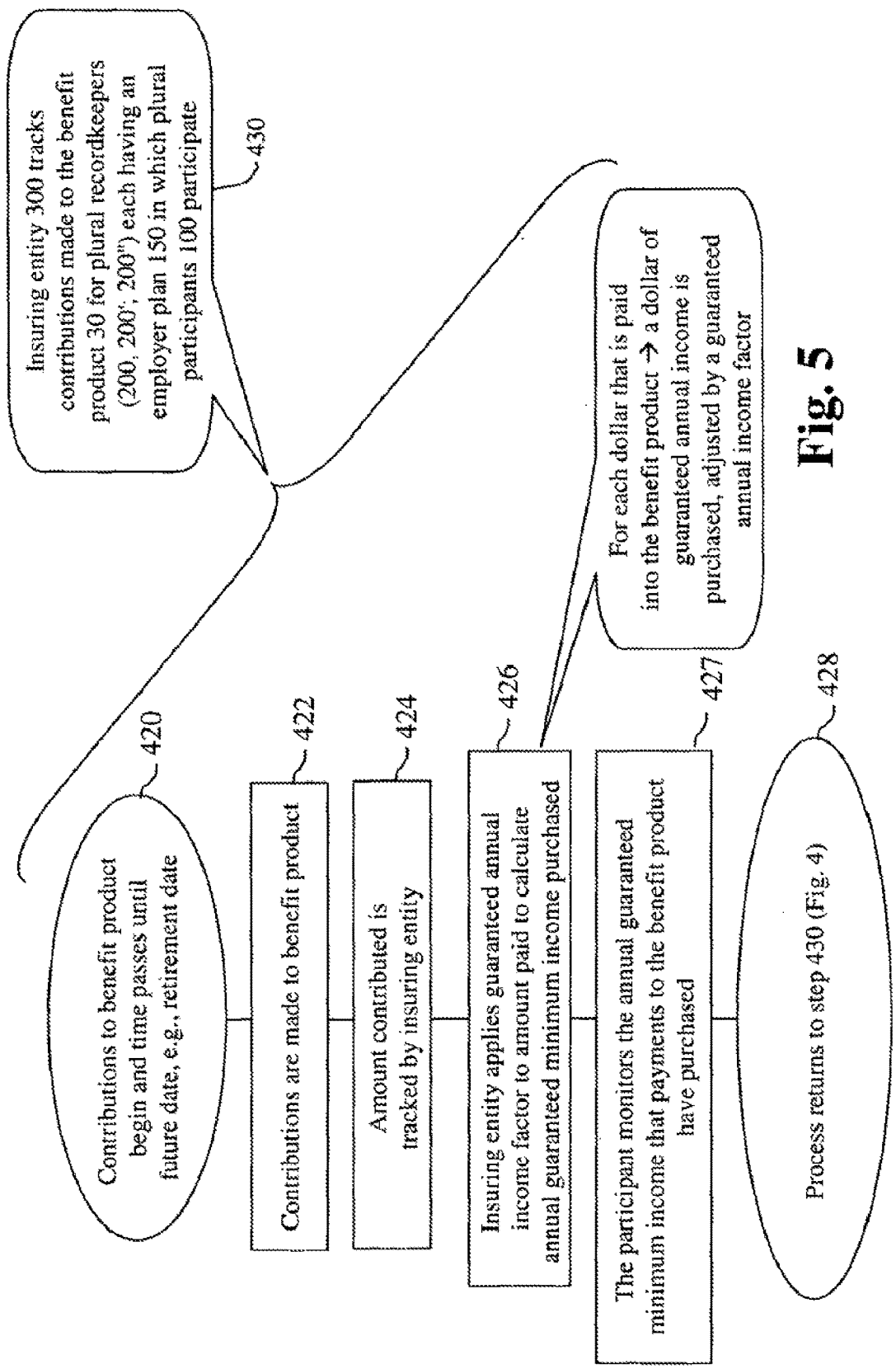
FIG. 5 is a flowchart showing further details of the process of FIG. 4 in accordance with one embodiment of the invention.

FIG. 5 is a flowchart showing further details of the "benefit product is implemented and time passes until the start date" step 420 in accordance with one embodiment of the invention.

As shown in FIG. 5, the subprocess starts in step 420 and passes to step 422. In step 422, the participant pays into the benefit product. Then, in step 424, the amount paid on behalf of the participant is tracked by the income recordkeeper, e.g., by the income recordkeeper record keeping system 330. As can be appreciated, the payment by the participant to the benefit product and/or the tracking performed by the income recordkeeper 300 may be performed repeatedly on some periodic basis, such as a day to day, week to week, or month to month basis, for example.

In FIG. 5, box 430 reflects that the processing of FIG. 5 is effected for the plurality of savings recordkeepers (200, 200', 200"). That is, the insuring entity 300 tracks contributions made to the benefit product 30 for plural savings recordkeepers (200, 200', 200") each having an employer plan 150 in which plural participants 100 participate. In this manner, the hub and spoke arrangement of the invention is implemented.

After step 424 of FIG. 5, the process passes to step 426. In step 426, the income recordkeeper applies the guaranteed annual income factor (for that particular participant 100) to the amount paid on behalf of the participant into the benefit product 30. This is performed so as to calculate the annual guaranteed minimum income purchased. That is, for each dollar that is paid into the benefit product 30, a dollar of annual guaranteed minimum income is purchased, adjusted by the guaranteed annual income factor. Also in step 426, the annual guaranteed minimum income is adjusted based on any withdrawals from the monies paid to the benefit product 30. After step 426, the process of FIG. 5 passes to step 427.

In step 427, FIG. 5 illustrates that the participant 100 may monitor the annual guaranteed minimum income that payments to the benefit product have purchased. This might be performed via the income recordkeeper web site 310, or example, or some other interface.

Then, after step 427, the process passes to step 428. In step 428, the process returns to step 430 of FIG. 4, in accordance with this embodiment of the invention. Further processing is thereafter performed as described above with respect to FIG. 4.

In explanation of further aspects of the invention, the actual savings payout from benefit product 30 is of course controlled by (1) amounts paid in, and (2) the market conditions affecting the benefit product 30 over the years, i.e., with what underlying investments the benefit product 30 was invested and how those underlying investments performed. In contrast, the annual guaranteed minimum income is not affected by such market conditions, but rather merely reflects the monies paid into the benefit product 30, adjusted for any withdrawals taken. In accordance with one embodiment of the invention, there is no limit on the upside (resulting from the underlying investments in the benefit product 30) that the participant might receive. That is, the participant might receive more than the annual guaranteed minimum income from the benefit product 30. On the other hand, if the underlying investments of the benefit product 30 performed poorly, the participant may receive only the annual guaranteed minimum income provided by the benefit product 30.

As noted above, the annual guaranteed minimum income is not affected by such market conditions, but rather merely reflects the monies paid into the benefit product 30, adjusted for any withdrawals taken. The adjustment to the account may utilize any suitable calculation utilizing any number of factors. In one embodiment, monies taken out may simply reduce the annual guaranteed minimum income in some proportional manner.

Further, it is appreciated that the income recordkeeper 300 may include an adjustment module for comparing the calculated annual income payment amount and the guaranteed minimum periodic retirement income payment amount, and for outputting to the user at least the annual guaranteed minimum income, the adjustment module storing a balance in an adjustment account if the calculated income payment amount is less than the annual guaranteed minimum income payment amount. In accordance with one embodiment of the invention, the adjustment account functionality described in U.S. patent application Ser. No. 10/083,250 filed Feb. 27, 2002, which is incorporated herein by reference in its entirety, may be used.

That is, market gains in excess of the design basis of the product accrue to the benefit of the participant for all contributions made on behalf of the participant. In other words, as can be appreciated, the product offered by the income recordkeeper 300 (the insuring entity 301) will be financially structured so that the insuring entity anticipates a profit through the plan. However, it may well be that market gains exceed the design basis. Accordingly, these excess market gains accrue to the benefit of the participant 100.

As described above, the disclosed process further provides a conversion algorithm. The conversion algorithm, i.e., the guaranteed annual income factor, converts "contributions" to "retirement income guarantee" based on age at contribution, retirement age specified by the plan sponsor, and the contribution amount, for example. Factors used in the model are subject to periodic, e.g., annual review and update, which would typically be applicable only to future contributions. These factors include but are not limited to mortality assumptions, assumed interest rate assumptions, expected market performance, insuring entity risk tolerance, and product operating expenses, for example. It should be appreciated that the conversion algorithm might use any of a variety of factors relevant to providing the benefit features. Further, one of ordinary skill may utilize the considered factors in any of a variety of manners using different weighting or relationships, for example, so as to implement the conversion algorithm. The implementation of the conversion algorithm might well be based on a risk assessment by the insuring entity and their understanding of the market conditions affecting the benefit product 30.

Various aspects of the benefit product 30, which has an annual guaranteed minimum income, are described above. In the invention the benefit product is implemented in the environment of one income recordkeeper 300 working with a number of savings recordkeepers 200. In order to implement this arrangement of one income recordkeeper 300 working with a number of employer plans 150 and savings recordkeepers (200, 200', 200"), the disclosed process includes a scalable system design to support unique plan and savings recordkeeper requirements. In accordance with one aspect of the invention, this may be performed in a single instance of a software application. In accordance with one embodiment of the invention, this single instance establishes a series of tables used to translate formats of individual savings recordkeepers and to schedule the delivery of savings recordkeeper data to the various income recordkeeper systems. In this implementation, the addition of a new employer plan simply requires a minor table change for a new plan within an existing savings recordkeeper for adjusting the delivery schedule, with a moderate set of table changes (scheduling and front end translation) being required to add a new savings recordkeeper. Without this approach, multiple complex changes would have to be executed and multiple software instances would be required to add additional plans or savings recordkeepers.

Further aspects of the scalable system in accordance with one embodiment of the invention are described below with reference to FIG. 6.

Figure 6:
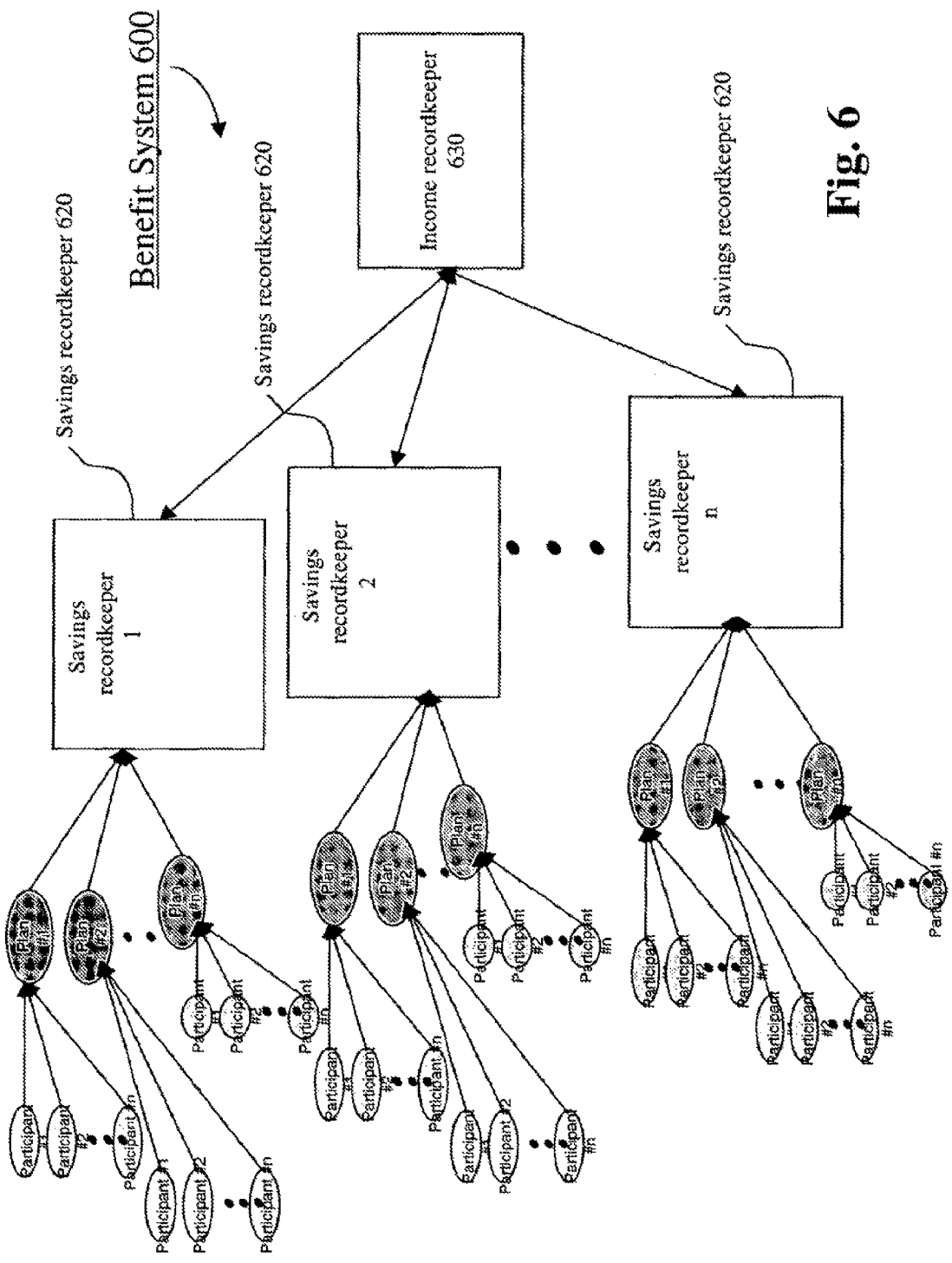
FIG. 6 is a block diagram showing a further scalable system having an income recordkeeper interacting with a plurality of savings recordkeepers in accordance with one embodiment of the invention.

FIG. 6 is a block diagram showing a benefit system 600 in accordance with a further embodiment of the invention. In particular, FIG. 6 further shows aspects of the scalability of the system 600, and is generally of the same arrangement as FIGS. 1 and 2. As shown, the system 600 includes an income recordkeeper 630. The income recordkeeper 630 interacts with numerous savings recordkeepers 620. For example, a savings recordkeeper 620 might be a third party administrator. In accordance with one embodiment of the invention, each of the savings recordkeepers 620 and the income recordkeeper 630 may be provided with the same functionality as is described above with reference to FIGS. 1-3.

As shown in FIG. 6, each savings recordkeeper 620 may be associated with multiple plans. In the role of an underwriter, the income recordkeeper 630 can interact with each of the savings recordkeepers 620, and specifically the systems of the savings recordkeepers 620 so as to implement the inventive product. Further, the system 600 of FIG. 6 can easily be expanded so as to interface with additional savings recordkeeper systems. Accordingly, FIG. 6 depicts a hub and spoke architecture to allow an income recordkeeper 630 to support interfaces with multiple employer plans 150 managed by multiple savings recordkeepers 200.

In accordance with one characterization of the invention, the invention may be viewed as a cascading process. That is, as shown in. FIG. 6, a cascade of participants feed into a particular plan, a cascade of plans feed into a particular savings recordkeeper, and a cascade of savings recordkeepers feed into the income recordkeeper 630. In one embodiment, the systems and methods of the invention provide for the communications, including the exchange of data, needed to implement the cascaded arrangement of FIG. 6.

In accordance with one embodiment of the invention and as discussed above, the income recordkeeper interface portion 320 provides an adaptable and extensible interface format capable of accepting the many different data formats established by plans 150 and savings recordkeepers 200, without requiring major updates of software each time a new format or protocol is encountered. Data formats and schedule information specific to each employer plan and savings recordkeeper are recorded in a series of tables maintained by the software application. With the approach of this implementation, the change needed to add a new employer plan is a simple addition of plan specific information to the appropriate table. In one embodiment of the invention, the change for a new savings recordkeeper consists of adding a record definition to the appropriate table and making a new entry in the scheduling table.

It is noted that the income recordkeeper interface portion 320 also performs the scheduling function to efficiently consolidate the batched data inputs received from the various savings recordkeepers 200 and update the income recordkeeper record keeping system 330 in a timely manner.

It is noted that the invention has been described above in the general context of multiple savings recordkeepers interfacing with the income recordkeeper. It should be appreciated that implementation of the invention may include any of a variety of savings recordkeepers. That is, any of a variety of savings recordkeepers might be utilized to effect the role of "savings recordkeeper" as described herein, including but not limited to a plan sponsor, plan administrator, third party administrator, insuring entity or other competent party.

The implementation of the invention as described above is extremely flexible with the ability to accommodate multiple annuity types, different underlying or multiple investment funds, single or joint annuitants, qualified or non-qualified plan types, and/or other benefit products, for example. That is, while the invention has been described with reference to an annuity, it is appreciated that the invention might be used with any of a wide variety of benefit products. U.S. patent application Ser. No. 09/876,053 filed Jun. 8, 2001, U.S. patent application Ser. No. 10/083,250 filed Feb. 27, 2002, and U.S. Provisional Patent Application 60/614,589 filed Oct. 1, 2004 which are each incorporated herein by reference in their entirety, describe a variety of annuities and products that might be used in conjunction with the features of the present invention. Further, any of the features described in such three applications may be used in conjunction with the features described herein.

In accordance with one aspect of the invention, a participant may be able to withdraw monies from the benefit product 30, as discussed above. For example, the participant might transfer monies to other investment options if allowed under the employer plan. However, one constraint placed on such withdrawals might be that the participant may only withdraw monies up to the point of annuitization (in the case that the benefit product is an annuity) or some other predetermined date. It is further appreciated that a variety of other constraints might be placed on the disclosed invention, as is set forth by the insuring entity and agreed to by the employer plan.

In accordance with one embodiment of the invention, withdrawals from the benefit product 30 (with reference to FIG. 1) result in an adjustment to the annual guaranteed minimum income. This adjustment may be effected using any suitable arrangement. For example, the adjustment might be based on a ratio of "withdrawal amount" to "account value" prior to withdrawal. However, other relationships may be used, as should be readily apparent to one of ordinary skill.

As described in detail above, the invention provides a benefit product that provides an annual guaranteed minimum income, with possible growth that accrues to the participant. Further, as should be apparent, the annual guaranteed minimum income is tied to the design basis of the benefit product. The design basis may require that the participant terminate the accumulation phase on or after a particular date. As described above, this date might be a retirement date. However, it is appreciated that the process of the invention does not necessarily have to be tied to retirement age or a retirement date. Further, in the case that the benefit product 30 with annual guaranteed minimum income is indeed tied to a retirement date, it may be the case that actual retirement of the individual is not required. In short, the date at which the accumulation period ends may be viewed as simply some future start date, which is agreed upon by the various parties.

As discussed above with reference to FIG. 1, the employer plan 150 includes a plurality of plan investment options 20. In accordance with one embodiment of the invention, one (and only one) of those plan investment options 20 is the benefit product 30. That is, the benefit product 30 is the investment option in which the participant invests to secure the annual guaranteed minimum income. However, it is appreciated that (in a different embodiment of the invention) two or more of the plan investment options 20 may result in an annual guaranteed minimum income. Further, if two benefit products 30 are associated with an annual guaranteed minimum income, it may be the case that each of such benefit products carry the same income guarantee. In other words, contributions to two respective benefit products 30 may result in annual guaranteed minimum income by applying the same guaranteed annual income factor.

However, in a further variation, it may be effected that different guaranteed annual income factors are applied to respective benefit products 30. This would result in a blended rate of sorts and would indeed add to the complexity of the calculation of the annual guaranteed minimum income. However, the appeal of such added feature (of different guaranteed annual income factors applied to different benefit products) might in some circumstances justify the added complexity.

The invention has been described herein with reference to an annual guaranteed minimum income. However, it is appreciated that the guaranteed minimum income associated with a particular benefit product 30 does not have to be dependent on an annual basis of payment. That is the product described herein (including the benefit product 30 with guaranteed minimum income) may provide a guaranteed minimum income based on any suitable periodic structure.

In further explanation of one aspect of the invention, the invention has been illustratively described above in the context that the benefit product 30 may be funded by payments from the employer plan 150 on behalf of the participant. However, in the invention, funds or monies may be paid into the benefit product 30 in any suitable manner. Accordingly, these payments might be characterized as payments, or contributions, or purchases, for example. Further, it is noted that generally payments are made by plan on behalf of participants. However, payments might in some situations be paid directly by the participant 100. This might be true with a rollover, where a participant rolls over money to a trustee, who makes the purchase on behalf of participant.

Also, it is noted that in FIG. 1, for example, the invention has been explained in the context of an employer plan 150. However, the systems and methods of the invention does not have to be implemented in an employer/employee situation. Rather, a plan of the invention might be implemented using some other group of affiliated persons, e.g., such as a trade group. Accordingly, the participant 100 does not necessarily have to be an employee. With regard to the group of affiliated individuals, the persons who are entitled to participate in the plan are mandated by plan eligibility rules.

In implementation of the benefit system as described herein, it is appreciated that the savings recordkeeper and the income recordkeeper do not have any particular type of affiliation or relationship to each other, either from a technical perspective or from a legal perspective, and as used herein, they are "unaffiliated third parties," notwithstanding any other contractual relationships among the unaffiliated third parties which may exist for other business interests. Other business interests could include, for example, an income record keeper that also provides group life insurance to the savings recordkeeper, in which case the entities would still be considered unaffiliated third parties, as used herein. In an example where the entities would not be considered unaffiliated third parties, the income recordkeeper and the savings recordkeeper might be separate entities each owned by the same holding company or other legal structure.

As described herein (and in the unaffiliated third party relationship between the savings recordkeeper and the income recordkeeper), the savings recordkeeper merely needs to provide data to the income recordkeeper. Accordingly, the unaffiliated third parties (the savings recordkeeper and income recordkeeper) do of course interact as described herein and as otherwise needed to effect the described benefit product. Thus, such unaffiliated third party relationship allows an income recordkeeper, who is utilizing the present invention, to readily adapt to interfacing with new and different savings recordkeepers (each who may have new and different data types).

In accordance with one embodiment of the invention, it is appreciated that the income recordkeeper record keeping system 330 (including the software and other components to provide the income recordkeeper record keeping system 330) might be housed, maintained and/or developed by a third party, i.e., as an alternative arrangement to the arrangement shown in FIG. 1. Such third party might be a software entity or some third party vendor, for example. Further, the income recordkeeper interface portion 320 and the database 340, for example, might be housed in such a third party, as an alternative to the arrangement of FIG. 2. In such an arrangement (of the income recordkeeper interface portion 320, the income recordkeeper record keeping system 330, and/or the data base 340 housed in a third party), the third party would not be the income recordkeeper. That role would be assumed by an insuring entity. However, the third party would be providing and/or implementing the components of the income recordkeeper record keeping system used by the income recordkeeper. Accordingly, the third party might allow use of its income recordkeeper record keeping system, for example, to one or multiple insuring entities, such as via a license or otherwise.

As described above, the income recordkeeper 300 monitors and tracks the annual guaranteed minimum income associated with each participant. However, it is appreciated that annual guaranteed minimum income information might be output from the income recordkeeper 300 to the savings recordkeeper 200, as desired. For example, the savings recordkeeper 200 might desire annual guaranteed minimum income for inclusion in statements to participants, or for posting on the savings recordkeeper web site 210.

As described above, FIGS. 1-3 and 6 discussed above show embodiments of a structure and system of the invention. Further, FIGS. 4 and 5 show various steps of one embodiment of the method of the invention. It is appreciated that the systems and methods described herein may be implemented using a variety of technologies. Hereinafter, general aspects regarding possible implementation of the systems and methods of the invention will be described.

It is understood that the system of the invention, and portions of the system of the invention, may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system implementing a benefit product for a participant with a guaranteed minimum income, the system comprising:
   an income recordkeeper interfacing with a plurality of savings recordkeepers, the income recordkeeper in the form of a processing machine, the income recordkeeper including:
      an income recordkeeper interface portion that inputs attributes to the benefit product funded by payments from a plan associated with the benefit product;
      an income recordkeeper record keeping system that implements the benefit product, the income recordkeeper record keeping system in communication with the income recordkeeper interface portion, the income recordkeeper record keeping system programmed to:
         monitor one or more transactions relating to the benefit product; and
         determine, based on the transactions, a guaranteed minimum income associated with participation in the benefit product, the guaranteed minimum income being an amount paid from the benefit product beginning on a future start date, wherein payment into the benefit product secures the guaranteed minimum income for a payout phase of the benefit product following an accumulation phase of the benefit product, and
         determine a guaranteed income factor;
      where the income recordkeeper record keeping system uses the guaranteed income factor to transform dollar transactions to the benefit product to determine the guaranteed minimum income paid on the future start date; and
   wherein the income recordkeeper interface portion receives the attributes of the benefit product from the plurality of savings recordkeepers.

2. The system of claim 1, the income recordkeeper further monitors transactions from the benefit product.

3. The system of claim 1, wherein the guaranteed income factor is based on age of the participant.

4. The system of claim 3, wherein the guaranteed income factor is established for each age within an eligible age range of the benefit product.

5. The system of claim 4, wherein the guaranteed income factor is determined, by the income recordkeeper record keeping system, based on age of the participant and as a result of a calculation based on a plurality of factors, and the guaranteed income factor being a guaranteed annual income factor.

6. The system of claim 5, wherein the plurality of factors used by the income recordkeeper record keeping system includes each of a specified start age when income payments are assumed to commence, the annuity payout form of income payments, mortality factors and an interest rate that varies with the number of years from the benefit product-determined participant's age to a specified start age.

7. The system of claim 6, wherein the specified start age when income payments commence are a stipulated age.

8. The system of claim 1, wherein the benefit product is associated with earnings based on market conditions, and wherein the guaranteed minimum income is independent of the earnings of underlying investments of the benefit product.

9. The system of claim 8, wherein the benefit product is a group annuity.

10. The system of claim 8, wherein the benefit product is a mutual fund with an insurance guarantee.

11. The system of claim 1, wherein the income recordkeeper record keeping system uses the guaranteed income factor to transform each dollar transaction to the benefit product so as to determine the guaranteed minimum income that is paid on a future start date.

12. The system of claim 1, wherein the income recordkeeper record keeping system effects adjustments on the guaranteed minimum income based on withdrawals from the benefit product.

13. The system of claim 1, wherein the system includes a savings recordkeeper record keeping system that is maintained by the savings recordkeeper; and
   the income recordkeeper interface portion and the income recordkeeper record keeping system are each maintained by an insuring entity, the savings recordkeeper record keeping system interfacing with the income recordkeeper interface portion to input the attributes in a periodic batched manner, the income recordkeeper interface portion converting the attributes for processing by the income recordkeeper record keeping system.

14. The system of claim 13, wherein the system further includes an income recordkeeper web site, the income recordkeeper web site being maintained by the insuring entity, the income recordkeeper web site providing for participants to access information relating to the benefit product and to the guaranteed minimum income.

15. The system of claim 1, further including an income recordkeeper-maintained database maintained by the income recordkeeper, the income recordkeeper-maintained database in communication with the income recordkeeper interface portion and the income recordkeeper record keeping system, the income recordkeeper-maintained database maintaining data related to the benefit product for participants with balances in the benefit product.

16. The system of claim 15, wherein the income recordkeeper interface portion performs conversion of data received from each savings recordkeeper's record keeping system to be processed by the income recordkeeper record keeping system.

17. The system of claim 16, wherein the income recordkeeper-maintained database stores data to provide the income recordkeeper record keeping system with data to calculate the minimum income associated with each transaction to or from the benefit product and resultant cumulative guaranteed minimum income.

18. The system of claim 15, wherein the income recordkeeper-maintained database stores data to provide the income recordkeeper record keeping system with data to manage each of: corrections associated with implementation of the benefit product, projecting potential future minimum income guarantees under certain scenarios, and supporting "what if" analyses.

19. The system of claim 15, wherein the income recordkeeper-maintained database stores data to provide the income recordkeeper record keeping system with data to manage at least one selected from the group comprising corrections associated with implementation of the benefit product, projecting potential future minimum income guarantees under certain scenarios, and supporting "what if" analyses.

20. A system implementing a benefit product for a participant with a guaranteed minimum income, the system comprising:

an income recordkeeper interfacing with a plurality of savings recordkeepers, the income recordkeeper in the form of a processing machine, the income recordkeeper including:
  an income recordkeeper interface portion that inputs attributes to the benefit product funded by payments from a plan associated with the benefit product;
  an income recordkeeper record keeping system that implements the benefit product, the income recordkeeper record keeping system being in communication with the income recordkeeper interface portion, the income recordkeeper record keeping system programmed to:
    monitor one or more transactions relating to the benefit product; and
    determine, based on the transactions, a guaranteed minimum income associated with participation in the benefit product, the guaranteed minimum income being an amount paid from the benefit product beginning on a future start date, wherein payment into the benefit product secures the guaranteed minimum income for a payout phase of the benefit product following an accumulation phase of the benefit product, and
    determines a guaranteed income factor;
  wherein the income recordkeeper record keeping system uses the guaranteed income factor to transform dollar transactions to the benefit product so as to determine the guaranteed minimum income paid on the future start date.

\* \* \* \* \*